United States Patent
Fremlin et al.

(10) Patent No.: US 12,062,288 B2
(45) Date of Patent: Aug. 13, 2024

(54) DETERMINING EFFICIENT PICKUP LOCATIONS FOR TRANSPORTATION REQUESTS UTILIZING A PICKUP LOCATION MODEL

(71) Applicant: Lyft, Inc., San Francisco, CA (US)

(72) Inventors: John Torres Fremlin, New York, NY (US); Michael Sasha Frumin, Brooklyn, NY (US); Dorian Anthony Goldman, Brooklyn, NY (US); Man Geen Harold Li, New York, NY (US); Akshay Ramesh Patil, Brooklyn, NY (US); David Halsted Riege, San Francisco, CA (US); Kevin Stewart, Seattle, WA (US); Alexander Michael Weinstein, Seattle, WA (US)

(73) Assignee: Lyft, Inc., San Francisco, CA (US)

( * ) Notice: Subject to any disclaimer, the term of this patent is extended or adjusted under 35 U.S.C. 154(b) by 816 days.

(21) Appl. No.: 16/539,850

(22) Filed: Aug. 13, 2019

(65) Prior Publication Data

US 2021/0049911 A1    Feb. 18, 2021

(51) Int. Cl.
*G08G 1/00* (2006.01)
*G01C 21/34* (2006.01)
*G06F 17/18* (2006.01)

(52) U.S. Cl.
CPC ......... *G08G 1/202* (2013.01); *G01C 21/3438* (2013.01); *G01C 21/3461* (2013.01); *G06F 17/18* (2013.01)

(58) Field of Classification Search
CPC .............. G08G 1/202; G01C 21/3438; G01C 21/3461; G06F 17/18
See application file for complete search history.

(56) References Cited

U.S. PATENT DOCUMENTS

| | | | |
|---|---|---|---|
| 9,769,616 B1* | 9/2017 | Pao | H04W 4/023 |
| 2017/0169535 A1* | 6/2017 | Tolkin | G06Q 50/30 |
| 2018/0322420 A1* | 11/2018 | Marco | G06Q 30/0284 |
| 2018/0338298 A1* | 11/2018 | Pan | H04W 92/02 |
| 2020/0208999 A1* | 7/2020 | Tumuluru | G01C 21/3438 |

OTHER PUBLICATIONS

Brodsky, Isaac; H3: Uber's Hexagonal Hierarchical Spatial Index, 2018, Uber.com, pp. 3 (Year: 2018).*

* cited by examiner

*Primary Examiner* — Aniss Chad
*Assistant Examiner* — Chase L Cooley
(74) *Attorney, Agent, or Firm* — Keller Preece PLLC

(57) ABSTRACT

This disclosure describes a pickup location determination system that determines a pickup location for a received transportation request by filtering out door points based on various factors and by utilizing a pickup location model to select a pickup location from the filtered door points. For example, the disclosed systems generate door points relative to intersection points within a request radius of a request location associated with a received transportation request. The disclosed systems generate potential pickup locations by filtering out door points that are impractical and/or inefficient based on proximity to other door points, locations relative to venues, locations relative to side streets, and/or locations between parallel road segments (e.g., medians). The disclosed systems further utilize a pickup location model to select a pickup location from the potential pickup locations.

20 Claims, 16 Drawing Sheets

DETERMINING EFFICIENT PICKUP LOCATIONS FOR TRANSPORTATION REQUESTS UTILIZING A PICKUP LOCATION MODEL

BACKGROUND

In recent years, both popularity and usage of on-demand transportation matching systems have increased. Indeed, the proliferation of web and mobile applications has enabled requesting individuals to request transportation from one geographic location to another. For instance, an on-demand transportation matching system can receive transportation requests and can pair the requests with providers that can transport requesting individuals to destination locations.

Despite the advances of these systems, conventional on-demand transportation systems continue to suffer from a number of disadvantages, particularly in their accuracy and efficiency. As an initial problem, conventional on-demand transportation systems often determine inaccurate locations for picking up requesters. To elaborate, while these conventional systems can determine pickup locations based on a number of factors including requester device location and provider device locations, these conventional systems nevertheless generate inaccurate pickup locations that require requesters to meet transporters at inconvenient, inefficient locations. For example, some conventional systems generate faulty pickup locations that would require a requester to stand in the middle of an intersection, on a median, inside a building, on a roof, or in other locations that are impossible, impractical, dangerous, or otherwise inaccurate.

In addition, conventional on-demand transportation systems are inefficient. Particularly, conventional systems require excessive computation power and computation time. For example, many conventional systems process large amounts of data for a single transportation request to generate potential pickup locations which are used as a basis for selecting an actual pickup location for the request. However, without more intelligent processing through the large numbers of potential pickup locations, these conventional systems often rely on an onerous brute force approach to select a pickup location. Thus, these systems inefficiently utilize computing resources such as processing power and processing time in selecting pickup locations.

These, along with additional problems and issues, exist with conventional on-demand transportation systems.

SUMMARY

This disclosure describes one or more embodiments of methods, non-transitory computer-readable media, and systems that solve the foregoing problems in addition to providing other benefits. While this summary refers to systems for simplicity, the summary also applies to certain disclosed methods and non-transitory computer-readable media. To solve the foregoing and other problems, the disclosed systems can intelligently generate potential pickup locations within a walkable radius of a request location based on door locations near intersections within the walkable radius. In some embodiments, the disclosed systems utilize one or more filtering techniques to remove locations that are impractical, impossible, and/or inefficient as potential pickup locations. For example, the disclosed systems can utilize one or more application programming interfaces ("APIs") to remove as potential pickup locations those locations that are too close together, located on medians, too close to particular venues, and/or located on side streets. In addition, the disclosed systems can utilize a pickup location model to select a pickup location for a transportation request from a pool of potential pickup locations that satisfy the requirements of the various filtering techniques. By filtering out locations that are impractical, impossible, and/or inefficient, the disclosed systems can determine more accurate pickup locations in a more computationally efficient manner.

The following description sets forth additional features and advantages of one or more embodiments of the disclosed methods, non-transitory computer-readable media, and systems. In some cases, such features and advantages are evident to a skilled artisan from the description or learned by the practice of the disclosed embodiments.

BRIEF DESCRIPTION OF THE DRAWINGS

The detailed description refers to the drawings briefly described below.

DETAILED DESCRIPTION

Figure 1:
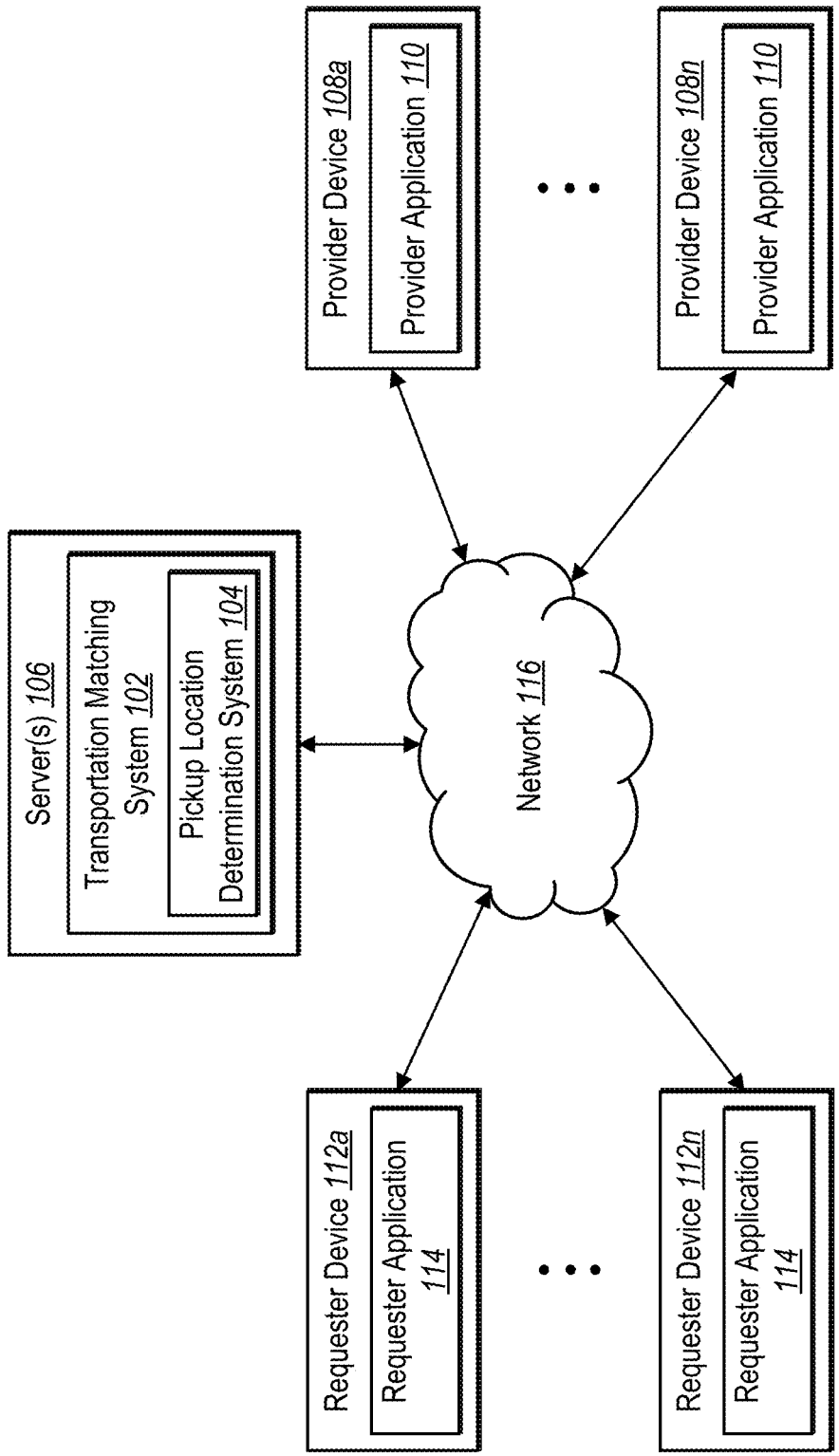
FIG. 1 illustrates a block diagram of an environment for implementing a dynamic pickup location determination system in accordance with one or more embodiments.

This disclosure describes a dynamic pickup location determination system that can utilize a pickup location model to determine a pickup location for a transportation request based on a request location, one or more filtering techniques to remove potential locations based on various factors, and availability of providers. In particular, the pickup location determination system can identify intersection points within a request radius of a request location. Based on the intersection points, the pickup location determination system can determine door points (e.g., potential pickup locations) within an intersection radius of a given intersection point. The pickup location determination system can further filter out door points bases on various factors such as proximity to other door points, proximity to particular venues, locations along particular streets, and/or locations within medians. In some embodiments, the pickup location determination system utilizes additional or alternative filtering techniques such as one or more application programming interface ("API") for analyzing and removing door points. In these or other embodiments, the pickup location determination system further utilizes a pickup location model to select a pickup location from the potential pickup locations or door points.

As mentioned, the pickup location determination system can generate a pickup location within a request radius of a request location. Indeed, in some circumstances a requester may desire to save time and/or money with a transportation request and is willing to walk a certain distance to a pickup location for a lower price, a shorter wait time, a shorter transportation distance, and/or a shorter transportation duration within a transportation vehicle. Across the requester base of the system, the pickup location determination system can receive many transportation requests from requesters willing to walk to a pickup location. Additionally (or alternatively), the pickup location determination system can receive shared ride requests where requesters would prefer (or are at least willing) to share a transportation vehicle with one or more other requesters. Based on receiving requests for shared rides and/or for pickup within a walking distance of a request location, the pickup location determination system can generate a pickup location within a request radius of a request location of a received transportation request.

To generate the pickup location, the pickup location determination system can generate and select from a number of potential pickup locations or door points. To elaborate, the pickup location determination system can identify historical pickup locations (e.g., pickup locations associated with previous transportation requests) near intersection points that are within a request radius from a request location. In some embodiments, the pickup location determination system determines the intersection points within the request radius by identifying street corners where road segments intersect.

The pickup location determination system can further define an intersection radius around one or more intersection points and identify door points within the one or more intersection radii. In some embodiments, the pickup location determination system identifies locations where previous requesters were picked up within an intersection radius. In these or other embodiments, the pickup location determination system determines locations of previous pickup locations relative to particular addresses as the door points. In other embodiments, the pickup location determination system determines the actual pickup location relative to request locations (e.g., locations of requester devices at the time of requesting transportation) of previous transportation requests. In still other embodiments, the pickup location determination system determines a sidewalk location, a street location, or a door location of a building closest to a request location and/or a previous pickup location as a door point.

In addition to determining the door points, the pickup location determination system can determine selection scores associated with door points. For example, the pickup location determination system can utilize a pickup location model to determine scores associated with door points, where a higher score indicate a better choice to use as a pickup location. Indeed, the pickup location determination system can determine selection scores based on various factors including, but not necessarily limited to, a distance from a request location, previous pickup locations, availability and locations of providers, current routes of providers, a type of request (e.g., shared or not shared), a time of day, a transportation distance, a destination location, and/or an estimated cost of transportation. The pickup location determination system can utilize the pickup location model to generate the selection scores in real time (or near real time) based on request locations, provider availability, and other transportation information monitored for a particular geographic region, intelligently balancing the needs requesters and providers across the system.

The pickup location determination system can further filter out door points identified within the intersection radii. In many circumstances, the number of door points is large and may include locations that are impractical or inefficient for use as a pickup location. Thus, the pickup location determination system can utilize one or more filtering techniques to filter out various door points that are undesirable for one reason or another.

For example, the pickup location determination system can filter out door points from the plurality of identified door points based on proximity to other door points. In some embodiments, the pickup location determination system determines proximity between door points based on an angular distribution of door points and proximities of door points to a request location (e.g., an origin where a transportation request is submitted by a user). In these or other embodiments, the pickup location determination system utilizes or calls an API (e.g., a doors API) to filter out door points based on proximity to other door points. Particularly, the pickup location determination system can determine a threshold distance and can identify any door points that are within the threshold distance from another door point. The pickup location determination system can further filter out or remove one or more of those door points from consideration as pickup locations. For instance, between two or more door points within the threshold distance, the pickup location determination system can select the door point with the highest selection score and can remove the other lower-scored door points.

In addition (or alternatively), the pickup location determination system can utilize a filtering technique to remove door points based on locations of the door points relative to medians or other areas located between two parallel (e.g., roughly or substantially parallel) road segments. In some embodiments, the pickup location determination system utilizes or calls an API (e.g., a medians API) to filter out door points that are located between two parallel road segments. In these or other embodiments, the pickup location determination system identifies door points that are located between two parallel road segments based on a geometric analysis of the parallel road segments. The pickup location determination system filters out those door points to remove the danger and impracticality of utilizing a pickup location on a median. Additional detail regarding the determination of those door points that fall within medians is provided below with reference to the figures.

In some embodiments, the pickup location determination system filters out door points based on proximity to particular venues. For example, the pickup location determination system can utilize or call an API (e.g., a venues API) to filter out one or more door points based on proximity to venue locations. In some embodiments, the pickup location determination system identifies venues based on geographic location, time of day, and/or an event schedule to determine those locations that are likely to have large crowds of people. Based on identifying venues, the pickup location determination system can determine a threshold venue distance and can remove those door points within the threshold venue distance from the venue location.

Further, the pickup location determination system can filter out door points based on location relative to particular streets or roads. For example, the pickup location determination system can utilize or call an API (e.g., a streets API or a roads API) to filter out door points located on or near (e.g., on a sidewalk adjacent to) streets that are determined to be undesirable or unacceptable for pickup. To elaborate, the pickup location determination system can identify or designate roads or streets as undesirable or unacceptable based on digital map information (e.g., street metadata from Open Streets Map Data) in addition to transportation information monitored over time and stored by a transportation matching system associated with the pickup location determination system. For example, the pickup location determination system can identify side streets, loading docks, private roads, service roads, or other roads that are not appropriate for a transportation pickup location. The pickup location determination system can further filter out door points along those roads from consideration as a potential pickup location.

In some embodiments, the pickup location determination system can filter out door points based on filtering out intersection points. In other words, the pickup location determination system can filter out intersection points and thereby filter out any door points within an intersection radius of the filtered-out intersection points. For instance, the pickup location determination system can filter out intersection points based on digital map information (e.g., street metadata from Open Streets Map Data) designating roads on which intersection points are placed as side streets, loading docks, private roads, service roads, or other roads that are not appropriate for pickup. The pickup location determination system can also (or alternatively) filter out intersection points that are within a threshold venue distance of a venue. Further, the pickup location determination system can filter out intersection points that are located on a median or in the middle of a roundabout or traffic circle.

In some embodiments, the pickup location determination system generates potential pickup locations based on the door points that remain after the filtering process(es). For example, the pickup location determination system can select the remaining door points as potential pickup locations. In addition, the pickup location determination system can input the potential pickup locations into a pickup location model to determine or select a pickup location from the potential pickup locations.

As outlined above, the pickup location determination system provides several advantages and benefits over conventional on-demand transportation systems. For instance, the pickup location determination system improves accuracy over conventional systems by filtering out locations that are impractical and/or inefficient. Indeed, whereas conventional systems generate pickup locations without consideration of real-world practicality—which can result in awkward and sometimes dangerous pickup locations—the pickup location determination system utilizes various filtering processes to ensure accurate pickup locations for transportation requests in accordance with cost-saving and/or time-saving considerations for a requester. Indeed, the pickup location determination system utilizes actual historical pickup information which have success metrics associated with them, and the pickup location determination system further relies on existing services which are monitored for accuracy. The pickup location determination system is also flexible in that it integrates well with an online learning algorithm and can be applied in other location-determination systems as well.

In addition, the pickup location determination system improves efficiency over conventional systems. For example, while some conventional on-demand transportation systems process large numbers of potential pickup locations using brute force optimization techniques to select a best result of potentially thousands (or millions) of possible results, the pickup location determination system reduces the computation time and computation power required to determine pickup locations by intelligently implementing various filtering processes to reduce the overall number of potential locations from which to select using a pickup location model. Thus, instead of inputting every possible location within a radius of a request location, which is a computationally-expensive process done in many conventional systems, the pickup location determination system pre-processes much of the information so that only a fraction of the total number of locations are input into a pickup location model.

As illustrated by the foregoing discussion, the present disclosure utilizes a variety of terms to describe features and advantages of the pickup location determination system. For reference, additional detail is now provided regarding the use and definition of these terms. For example, as used herein, the term "request location" refers to a geographic location of a requester device upon submitting a transportation request. A request location can include a GPS location (e.g., a latitude, a longitude, and an altitude or elevation) or a street address received from a requester device or otherwise determined by the pickup location determination system upon receiving a transportation request from the requester device.

As mentioned, the pickup location determination system can determine intersection points within a request radius of a request location. As used herein, the term "request radius" refers to a distance or time away from a request location. For example, a request radius can include a distance such as 100 feet or 100 meters or some other distance. In some embodiments, a request radius can include a distance associated with a walking time (e.g., 150 seconds or 300 seconds) away from a request location. Relatedly, the term "intersection point" refers to a location on or near an intersection of two or more road segments. For example, an intersection point can include a coordinate location of a potential pickup location or a base pickup location (e.g., a location in relation to which a pickup location can be determined) relative to an intersection where two road segments meet. In some embodiments, an intersection point can include a coordinate location on a street corner where two sidewalks connect at an intersection of road segments. An intersection point can also (or alternatively) include a location a set distance (e.g., 10 meters or 20 meters) from an intersection along a road segment or a sidewalk.

As mentioned, the pickup location determination system can determine door points within an intersection radius of an intersection point. As used herein, the term "intersection radius" refers to a distance or time away from an intersection point. For example, an intersection radius can include a distance such as 20 feet, 20 meters, or 50 meters from an intersection point. In some embodiments, an intersection radius can include a distance associated with a walking time (an average time it would take to walk the distance). Relatedly, the term "door point" refers to a geographic location (e.g., a latitude, a longitude, and an altitude or elevation) of a pickup location. For example, a door point can include a coordinate location of a historical pickup location. Indeed, a door point can include a previous pickup location where a previous requester was picked up for a transportation request that originated within a threshold distance of a current transportation request. In some embodiments, a door point can include a coordinate location of a point on a sidewalk or street that indicates a previous pickup location. In the same or other embodiments, a door point can include a location along a street or sidewalk that is closest to the geographic location of a previous pickup location. In these or other embodiments, a door point can include a pickup location relative to a centroid of a building and that is associated with a requester history or a global system history, where the door point indicates a location where a requester was actually picked up in relation to the centroid of the building from which the request was made.

As mentioned above, the pickup location determination system can generate selection scores for door points. As used herein, the term "selection score" (or sometimes simply "score") refers to a score or rating that indicates a compatibility of a location for use as a pickup location. A selection score can be based on numerous factors including a request location (of a given transportation request and/or other transportation requests across the system), a number of previous pickups at the given location, a frequency of pickups at the given location, provider locations and availability, a request time, a destination location, and a request type (e.g., shared or not shared).

As mentioned, the pickup location determination system can filter out door points based on various factors including proximity to medians, venues, other door points, and side streets. As used herein, the term "venue" refers to a building or other location that has large numbers of people that affects pickup at nearby locations. In some embodiments, venues are only considered at particular times when events are taking place at the venues. For example, a venue can include a stadium, an arena, a ballpark, a fairgrounds, a concert hall, or a theater.

In addition, to filter out door points on medians (or between two parallel road segments), the pickup location determination system can determine a start node and an end node for each of the road segments. As used herein, the term "start node" refers to a location that indicates a start or origin of a road segment. Relatedly, the term "end node" refers to a location that indicates an end or termination of a road segment. In some embodiments, start nodes and end nodes correspond to intersections (e.g., centroids of intersections or edges of intersections). In addition, the term "road segment" refers to a portion of a street or road. For example, a road segment can refer to a discrete portion of a road that is between two intersections or nodes (e.g., a start node and an end node).

As also mentioned, the pickup location determination system can generate potential pickup locations based on door points. As used herein, the term "potential pickup location" refers to a geographic location where a requester could be picked up for a transportation request. For example, a potential pickup location can include a coordinate location of a door point that has not been filtered out by the filtering techniques or processes implemented by the pickup location determination system. Thus, a potential pickup location is a pickup location that the pickup location determination system determines is not dangerous, impractical, inefficient, or otherwise undesirable.

Based on the potential pickup locations, the pickup location determination system can determine or select a pickup location for a transportation request. As used herein, the term "pickup location" refers to a geographic location where the pickup location determination system determines that a provider will pick up a requester for a transportation request. To determine a pickup location from a plurality of potential pickup locations, the pickup location determination system can utilize a pickup location model. As used herein, the term "pickup location model" refers to an algorithm or a machine learning model that selects a pickup location from a pool of potential pickup locations based on various factors including provider availability, travel time (to a pickup location and/or to a destination location), and/or transportation cost. In some embodiments, the pickup location determination system utilizes an explore/exploit technique to train the pickup location model to generate a pickup location.

Relatedly, the term "train" refers to utilizing information to tune or teach a neural network. The term "training" (when used as an adjective or descriptor, such as in "training data" or "training vehicle telemetry information") refers to information or data utilized to tune or teach the neural network.

Additional detail will now be provided with reference to the figures. The description with respect to FIG. 1 provides an overview of the pickup location determination system. Thereafter, much of the disclosure describes components and processes of the pickup location determination system in further detail with reference to subsequent figures.

To illustrate, FIG. 1 includes a block diagram of an environment for implementing a pickup location determination system 104 in accordance with one or more embodiments. As shown in FIG. 1, the environment includes the server(s) 106 housing the pickup location determination system 104 as part of a transportation matching system 102. The environment of FIG. 1 further includes provider devices 108a-108n, requester devices 112a-112n, and a network 116. The server(s) 106 can include one or more computing devices to implement the pickup location determination system 104. Additional description regarding the illustrated computing devices (e.g., the server(s) 106, the requester devices 112a-112n, and the provider devices 108a-108n) is provided with respect to FIG. 12 below.

As shown, the pickup location determination system 104 utilizes the network 116 to communicate with the provider devices 108a-108n and the requester devices 112a-112n. For example, the pickup location determination system 104 communicates with the provider devices 108a-108n and the requester devices 112a-112n via the network 116 to match transportation requests with transportation providers. In some embodiments, per device settings, the pickup location determination system 104 receives device information from the provider devices 108a-108n and requester devices 112a-112n such as location coordinates (e.g., latitude and longitude) and status (currently transporting/riding, not transporting/riding, available, or unavailable).

To facilitate connecting requests with transportation provider vehicles, pickup location determination system 104 further communicates with the provider devices 108a-108n (e.g., through a provider application 110) and with the requester devices 112a-112n (e.g., through a requester application 114). Indeed, as shown in FIG. 1, each of the provider devices 108a-108n include a provider application 110. In many embodiments, the pickup location determination system 104 communicates with the provider devices 108a-108n through the provider application 110 to, for example, receive and provide information including request information and provider information. Additionally, the provider application 110 optionally includes computer-executable instructions that, when executed by the provider devices 108a-108n, cause the provider devices 108a-108n to perform certain functions. For instance, the provider application 110 can cause the provider devices 108a-108n to communicate with the pickup location determination system 104 to navigate to various places such as a target area, a requester's pickup location, a requester's destination location, as well as collect fares and bonuses for completed transportation requests.

Relatedly, as mentioned above, each of the requester devices 112a-112n includes a requester application 114. In many embodiments, the transportation matching system 102 communicates with the requester devices 112a-112n through the requester application 114 to, for example, receive and provide information including request information such as request location, request time, destination location, requester identification, a determined pickup location, a provider ETA, and an estimated cost. A requester may use a requester application 114 to, via a requester interface, request transportation services, select or confirm a pickup location, receive a price estimate for the transportation service, and access other transportation-related services. For example, a requester may interact with the requester device 112a through graphical user interfaces (e.g., a pickup location interface) of the requester application 114 to enter and/or confirm a pickup location and a destination for transportation. The pickup location determination system 104 can, in turn, provide to the requester device 112a, an estimated time of arrival of a provider (or transportation vehicle), or access to other transportation-related services through the requester application 114.

Although FIG. 1 illustrates the environment having a particular number and arrangement of components associated with the pickup location determination system 104, in some embodiments the environment may include more or fewer components with varying configurations. For example, in some embodiments, the environment includes a database either stored on the server(s) 106 or elsewhere in the environment, linked via the network 116. The database can include training data for training a pickup location model. The database can also (or alternatively) include requester-specific historical information pertaining to previous transportation requests (e.g., previous pickup locations) as well as global current and historical information for requesters and providers system-wide.

Figure 2B:
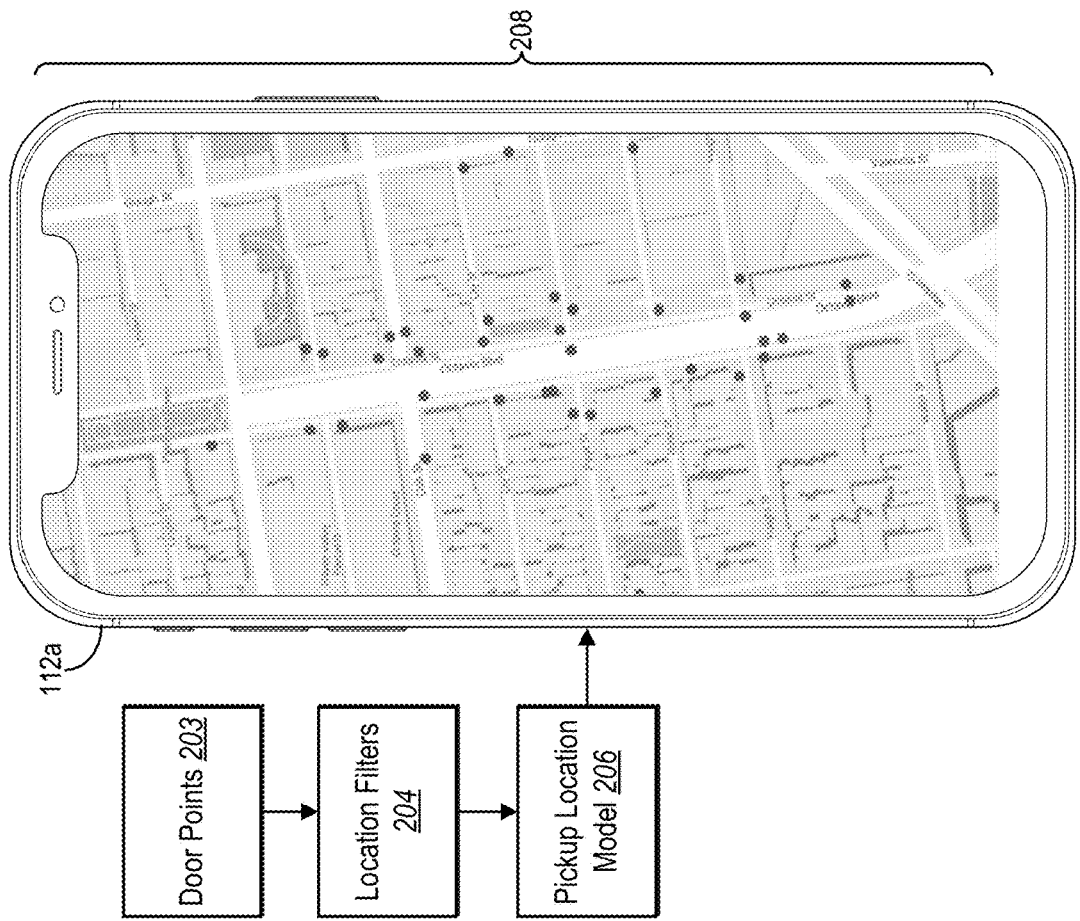
FIG. 2B illustrates an example improvement of the pickup location determination system in generating accurate, efficient potential pickup locations in accordance with one or more embodiments.
Figure 2A:
FIG. 2A illustrates an example digital map of inaccurate, inefficient potential pickup locations generated using a conventional system.

As mentioned, the pickup location determination system 104 can filter out some locations from consideration as potential pickup locations to improve accuracy and reduce computation expenses of generating pickup locations for transportation requests. Indeed, FIGS. 2A-2B illustrate an example depiction of the improvement of the pickup location determination system over conventional systems. As shown in FIG. 2A, the requester device 112a utilizes a conventional system in response to receiving a transportation request and displays a digital map 202 including a large number of potential pickup locations (indicated by the dots within the digital map 202), many of which are impractical, dangerous, or inefficient. As shown in FIG. 2B, and for the same transportation request within the same geographic region shown in the digital map 202, the pickup location determination system 104 determines door points 203, implements location filters 204, and utilizes a pickup location model 206, to cause the requester device 112a to display fewer potential pickup locations within the digital map 208, eliminating (or reducing) those locations that are impractical, dangerous, and/or inefficient.

As illustrated in FIG. 2B, the pickup location determination system 104 reduces or eliminates those potential pickup locations that are impractical or inefficient as compared to the potential pickup locations generated by a conventional system shown in FIG. 2A. As shown, the pickup location determination system 104 removes or filters out many of the potential pickup locations that are placed on medians, that are too close to other potential pickup locations, that are too close to particular venues, and/or that are located along side streets (e.g., alleys, service roads, etc.).

To generate potential pickup locations that exclude impractical or inefficient locations, the pickup location determination system 104 determines door points 203. In particular, for a received transportation request, the pickup location determination system 104 determines door points 203 by identifying intersection points within a request radius of a request location. The pickup location determination system 104 further determines door points within intersection radii for one or more of the intersection points. Additional detail regarding determining intersection points is provided below with reference to FIG. 3. Thereafter, additional detail regarding determining door points is provided with reference to FIG. 4.

In addition, the pickup location determination system 104 determines selection scores for the door points 203. More specifically, the pickup location determination system 104 analyzes transportation information collected by the pickup location determination system 104 and/or the transportation matching system 102 to determine selection scores. For instance, the pickup location determination system 104 determines selection scores for door points based on information such as request type (e.g., shared or not shared), request location, indication of a time-saving request (where door points that result in a faster transportation have higher scores) or a cost-saving request (where door points that result in less expensive pickup location have higher scores), time of day, time of week, event schedules, proximity of the door points to a request location (e.g., closer door points have higher scores), proximity of the door points to venues (where door points within a threshold distance of venues have lower scores), locations of door points relative to particular streets (e.g., smaller and/or slower streets have lower scores than larger and/or faster streets), and/or locations and availability of transportation providers (where door points near available providers have higher scores).

In some embodiments, the pickup location determination system 104 analyzes historical information and current information to determine selection scores for the door points 203. For example, the pickup location determination system 104 analyzes a request history associated with the requester who submits a transportation request to identify previous door points in relation to the previous request locations. For instance, the pickup location determination system 104 assigns higher selection scores to door points that correspond to (or are within a threshold distance of) previous request locations and/or previous door points for a requester.

In addition (or alternatively), the pickup location determination system 104 analyzes global historical information for the system as a whole to determine selection scores for door points. For instance, in some embodiments the pickup location determination system 104 determines higher selection scores for door points corresponding to door points determined for other requesters within an intersection radius of a request location, as compared to door points that do not correspond to any previous transportation requests across the system. In these or other embodiments, the pickup location determination system 104 determines higher selection scores for door points associated with personal requester historical information than for door points associated with global historical information. The pickup location determination system 104 may determine still higher selection scores for door points that correspond to both personal requester historical information and global historical information.

In addition to determining the door points 203, the pickup location determination system 104 applies one or more location filters 204 to filter out door points that are inappropriate for use as a potential pickup location based on various factors. For example, the pickup location determination system 104 filters out door points that are within a threshold distance of another door point. The pickup location determination system 104 further filters out door points located along side roads or other streets determined to be undesirable pickup locations (e.g., based on digital map metadata). The pickup location determination system 104 also (or alternatively) filters out door points that are within a threshold venue distance of a venue. In some embodiments, the pickup location determination system 104 filters out door points that are located on medians or otherwise placed between two substantially parallel (e.g., within a threshold number of degrees from parallel or within some epsilon) road segments. Additional detail regarding implementing the location filters 204 is provided below with reference to FIGS. 5-8.

As further shown, the pickup location determination system 104 also utilizes a pickup location model 206 to determine a pickup location for a transportation request based on filtered door points. Particularly, the pickup location determination system 104 generates potential pickup locations in the form of door points that are remaining or left over after applying the location filters 204. In addition, the pickup location determination system 104 inputs the location filters 204 into the pickup location model 206. In some embodiments, by utilizing the pickup location model 206, the pickup location determination system 104 determines or selects a single pickup location for the transportation request from the potential pickup locations.

In other embodiments, however, the pickup location determination system 104 enables a requester to select a pickup location from a plurality of possible locations. As illustrated in FIG. 2B, for example, the pickup location determination system 104 causes the requester device 112a to display a number of possible locations that are selectable to determine a pickup location. For instance, the pickup location determination system 104 utilizes the pickup location model 206 to generate multiple possible pickup locations (with different pickup times) based on availability and locations of different transportation providers. In these embodiments, the pickup location determination system 104 receives a selection (e.g., a click or a tap) to indicate a pickup location for a transportation request.

Figure 3:
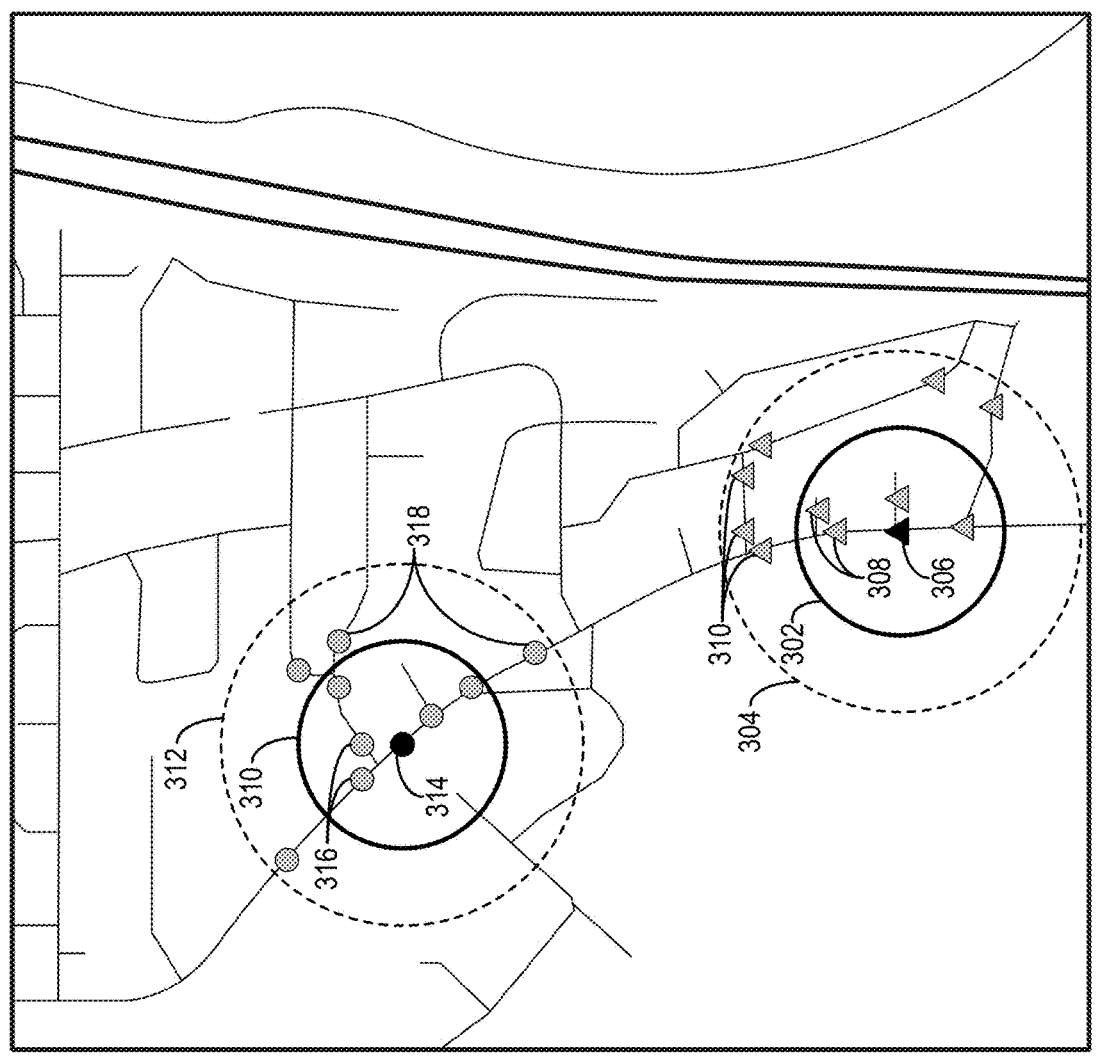
FIG. 3 illustrates an example of determining intersection points for a received transportation request in accordance with one or more embodiments.

As mentioned, the pickup location determination system 104 can identify intersection points within a request radius of a request location. FIG. 3 illustrates an example request location 306 associated with a received transportation request and for which the pickup location determination system 104 can identify intersection points. Particularly, the pickup location determination system 104 determines or identifies intersection points within a request radius of the request location 306. For example, the pickup location determination system 104 determines one or more request radius associated with a transportation request, such as the request radius 302 and/or the request radius 304. As shown, the request radius 302 (e.g., 150 seconds) is smaller than the request radius 304 (e.g., 300 seconds), though in some embodiments the pickup location determination system 104 determines only a single request radius for a request location (where the distance/time of the radius is system-determined or defined by a requester via a requester device as a "search area").

In addition, the pickup location determination system 104 determines intersection points 308 within the request radius 302 (as indicated by the gray shaded triangles). More specifically, the pickup location determination system 104 analyzes digital map information to identify locations of intersections to mark as intersection points. For example, the pickup location determination system 104 identifies some of the intersection points 308 located in centroids of intersections. As another example, the pickup location determination system 104 identifies others of the intersection points 308 located at corners where road segments meet (thus resulting in multiple intersection points for a single intersection in some cases). As still another example, the pickup location determination system 104 identifies some of the intersection points 308 a certain distance (e.g., 20 feet or 20 meters) from a corner where road segments meet. In these or other examples, the pickup location determination system 104 identifies intersection points along streets or along areas (e.g., sidewalks) adjacent to streets.

In embodiments where the pickup location determination system 104 utilizes a larger request radius 304—either in addition to the request radius 302 or as an alternative—the pickup location determination system 104 further identifies the intersection points 310 within the request radius 304. In embodiments where the pickup location determination system 104 utilizes two request radii for a transportation request (e.g., the request radius 302 and the request radius 304), the pickup location determination system 104 can determine selection scores for door points relative to intersection points 308 outside of the request radius 302 that are higher than selection scores for door points relative to the intersection points 310 within the request radius 304 but not within the request radius 302. Additional detail regarding determining door points and their selection scores is provided below with reference to FIG. 4.

As illustrated in FIG. 3, the pickup location determination system 104 receives an additional transportation request associated with a request location 314. As illustrated, the pickup location determination system 104 receives a first transportation request that indicates the request location 306 and a receives second transportation request that indicates a second request location 314. Indeed, while in some embodiments the pickup location determination system 104 receives and matches standard (non-shared) transportation requests, in other embodiments the pickup location determination system 104 receives and matches shared requests and analyzes multiple received shared requests to match a provider to service the multiple requests. As shown in FIG. 3, the pickup location determination system 104 can determine that the requests associated with the request locations 306 and 314 can be serviced by a single transportation vehicle. Indeed, in some embodiments, the pickup location determination system 104 utilizes a coalescing technique to determine a single pickup location for multiple requests, each received from a different requester device. Coalescing can be based on proximity between request locations in addition to other factors such as request times, destination locations, provider availability, and provider locations.

In addition, the pickup location determination system 104 can determine or identify intersection points 316 within the request radius 311 and can further identify intersection points 318 within the request radius 312, where the intersection points 316 and 318 are indicated by the gray filled circles. In some embodiments, the pickup location determination system 104 utilizes a uniform request radius for multiple transportation requests, where the request radius 311 is the same as the request radius 302 and/or the request radius 312 is the same as the request radius 304. In other embodiments, the pickup location determination system 104 determines an individual request radius for each received transportation request.

Figure 4:
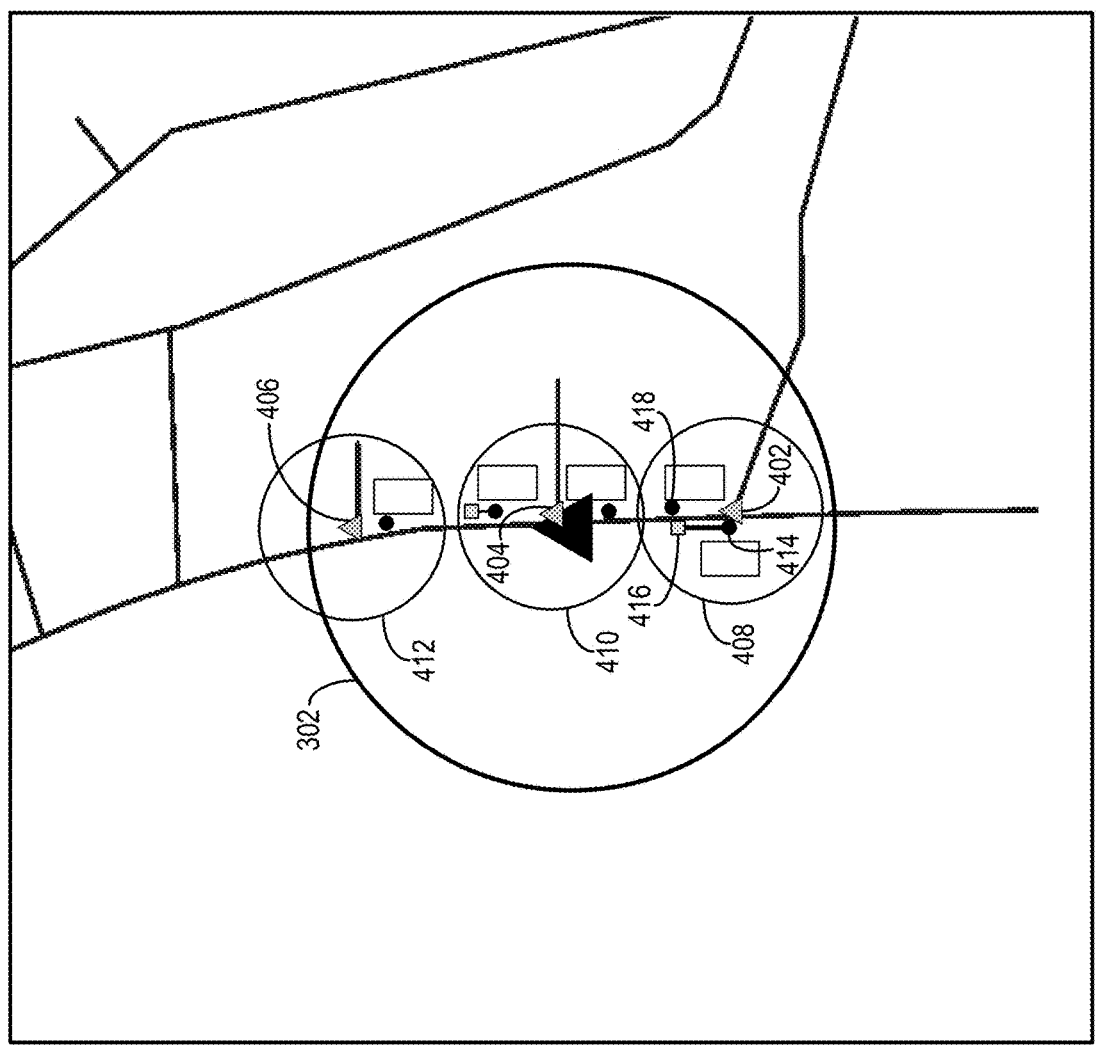
FIG. 4 illustrates an example of determining door points for a received transportation request in accordance with one or more embodiments.

As mentioned, the pickup location determination system 104 can determine door points in relation to various intersection points (e.g., the intersection points 308, 310, 316, or 318). For example, the pickup location determination system 104 can determine an intersection radius around one or more of the intersection points 308, 310, 316, or 318. For instance, as shown in FIG. 4, the pickup location determination system 104 generates an intersection radius 408 of a certain distance (or time) around the intersection point 402 and within the request radius 302. Similarly, within the request radius 302 for the same received transportation request associated with the request location 306, the pickup location determination system 104 determines an intersection radius 410 around the intersection point 404 and further determines an intersection radius 412 around the intersection point 406.

Additionally, the pickup location determination system 104 can determine door points within an intersection radius. For instance, the pickup location determination system 104 determines door points 414, 416, and 418 within the intersection radius 408. To elaborate, the pickup location determination system 104 analyzes digital map information to identify coordinate locations of previous pickup locations within the intersection radius 408. Indeed, the door point 414 and the door point 418 indicate locations of pickup locations that are within the intersection radius 408.

In some embodiments, the pickup location determination system 104 also (or alternatively) determines door points along streets where a requester could be picked up. To elaborate, the pickup location determination system 104 determines a location along a street nearby a coordinate location of a previous pickup location as a door point. As shown in FIG. 4, for instance, the pickup location determination system 104 identifies the door point 416 as a location corresponding to the pickup location indicated by the door point 414. For example, the pickup location determination system 104 utilizes a doors API to determine a centroid of pickup coordinates (latitudes and longitudes) for given addresses. In some embodiments, the pickup location determination system 104 determines the door point 416 as a closest street location to the door point 414 or to a centroid of a building from which a request originated for pickup at the door point 414.

In other embodiments, the pickup location determination system 104 determines the door point 416 based on requester-specific historical information and/or global historical information. For example, in some embodiments the pickup location determination system 104 identifies an address of a building (or a coordinate location of a centroid of the building) where a previous transportation request (either from the same requester or from a different requester) originated and further determines a previous pickup location corresponding to the previous request. Thus, the pickup location determination system 104 identifies the door point 416 for the previous pickup location from that building (the building indicated by the door point 414) based on previous pickup locations for previous transportation requests.

In some embodiments, the pickup location determination system 104 prioritizes requester-specific historical information to determine the door point 416. For instance, in circumstances where the pickup location determination system 104 has received multiple previous transportation requests from the building indicated by the door point 414, the pickup location determination system 104 determines the door point 416 as a previous pickup location of the specific requester. In other embodiments, however, the pickup location determination system 104 considers the previous requests of the requester together with those of other requesters to determine the door point 416 (e.g., by weighting the previous pickup locations, where the requester-specific pickup locations are weighted more heavily).

In some embodiments, the pickup location determination system 104 determines that a requester has no (or below a threshold amount of) historical information near a request location (e.g., the request location 306), and the pickup location determination system 104 instead utilizes only global historical information. In particular, the pickup location determination system 104 analyzes previous transportation requests from other requesters and further determines previous pickup locations for the previous transportation requests from the other requesters to use as door points (e.g., the door point 416).

As illustrated, the pickup location determination system 104 repeats the determination of door points for multiple (e.g., each) intersections within the request radius 302. For example, the pickup location determination system 104 generates door points within the intersection radius 410 and further generates door points within the intersection radius 412. Thus, the pickup location determination system 104 generates a plurality of door points within the request radius 302 for a received transportation request. Although not illustrated in FIG. 4, in some embodiments, the pickup location determination system 104 can determine door points within an intersection radius that are outside of a request radius. For instance, the pickup location determination system 104 can determine door points within the intersection radius 412 that fall outside the bounds of the request radius 302.

Figure 5:
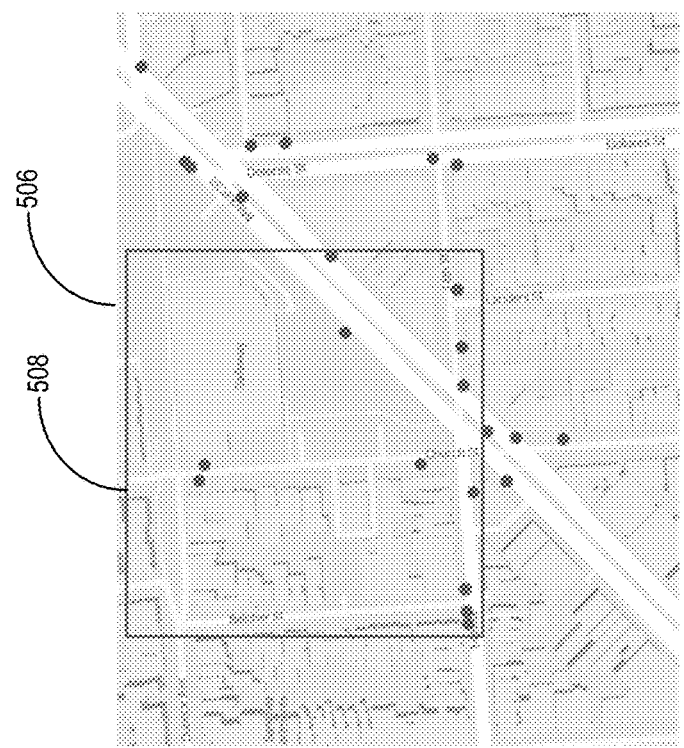
FIG. 5 illustrates an example of filtering out door points based on location relative to streets that are undesirable locations for picking up a requester in accordance with one or more embodiments.
Figure 5:
Figure 5:

As mentioned, the pickup location determination system 104 can filter out door points that are located along site streets or other streets that are determined to be undesirable for pickup. Indeed, FIG. 5 illustrates an example embodiment where the pickup location determination system 104 determines a plurality of door points located along streets that fail to satisfy an acceptability threshold for picking up a requester. As shown, the pickup location determination system 104 determines door points along side streets, alleys, or service roads that are slow, crowded, dead-ends, or otherwise impractical for navigating via a transportation vehicle. For example, the pickup location determination system 104 analyzes the digital map 502 to remove some door points indicated by the box 504 based on determining acceptability scores for the door points and comparing the acceptability scores with an acceptability threshold. Thus, as shown by the digital map 506 of the same geographic region as the map 502, the pickup location determination system 104 filters out those door points along streets that would be undesirable for pickup within the area indicated by the box 504 so that they do not appear within the corresponding box 508.

To determine or identify streets that are undesirable for pickup, the pickup location determination system 104 determines acceptability scores based on street information. In particular, the pickup location determination system 104 accesses digital map information (e.g., digital map information maintained by the pickup location determination system 104, the transportation matching system 102, or a third-party system). In particular, the pickup location determination system 104 utilizes an API for identifying streets that are undesirable for picking up a requester by determining acceptability scores for the streets and/or for door point along the streets. For example (as part of utilizing an API), the pickup location determination system 104 analyzes metadata associated with streets within a digital map to identify those streets that are undesirable for pickup by determining those streets whose door points fail to satisfy a threshold acceptability score. In some embodiments, the pickup location determination system 104 accesses street labels that indicate street types (e.g., interstate, highway, arterial, residential, side street, service road, alley, etc.) to identify those streets that are undesirable. Indeed, the pickup location determination system 104 can identify streets with these (or other) labels as "non-pickup roads" or incompatible roads.

In these or other embodiments, the pickup location determination system 104 determines acceptability scores associated with particular streets by monitoring and/or accesses information over a period of time to determine a number or frequency of transportation vehicles traveling down individual streets. Additionally, the pickup location determination system 104 determines undesirable streets as those streets that have a number or frequency of transportation vehicles traveling the streets over particular time periods that is below a threshold. In the same or other embodiments, the pickup location determination system 104 determines undesirable streets as those streets with below a particular threshold number or frequency of transportation requests that occur along the streets and/or that indicate pickup locations and/or destination locations along the streets.

Based on identifying door points that are located along streets that fail to satisfy an acceptability threshold, the pickup location determination system 104 can further filter out those door points. Thus, as shown in FIG. 5, for example, the pickup location determination system 104 filters out those door points that were located along side streets or alleys (or other streets that are undesirable for pickup). Indeed, the unfiltered digital map 502 illustrates door points within the box 504, while the filtered digital map 506 illustrates that many of those door points have been filtered out within the box 508.

In some embodiments, the pickup location determination system 104 filters out door points by filtering out intersection points. In particular, the pickup location determination system 104 identifies intersection points that are located on (or within a threshold distance of) roads labeled as alleys, service roads, dead-ends, or other undesirable roads and filters out those intersection points. Thus, the pickup location determination system 104 effectively filters out those door points within an intersection radius of filtered-out intersection points. In some embodiments, the pickup location determination system 104 determines acceptability scores for intersection points based on road labels of the intersection points and/or proximity to roads of various types/labels. In these embodiments, the pickup location determination system 104 filters out those intersection points (and the corresponding door points) that fail to satisfy a threshold acceptability.

Figure 6:
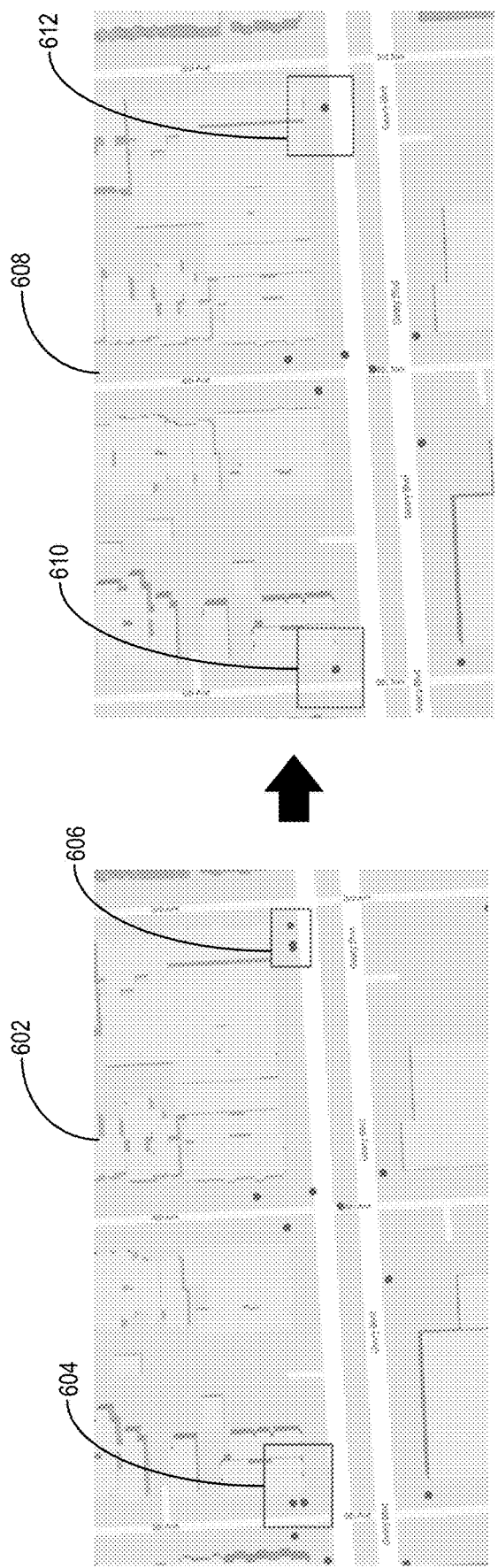
FIG. 6 illustrates an example of filtering out door points based on proximity to other door points in accordance with one or more embodiments.

As mentioned above, the pickup location determination system 104 can filter out door points that are within a threshold distance of one or more other door points. Indeed, FIG. 6 illustrates an example unfiltered digital map 602 and an example filtered digital map 608 that has some of the door points removed from the unfiltered digital map 602 filtered out or removed. In particular, the pickup location determination system 104 analyzes the door points to compare distances between them using a distance clustering algorithm. For example, the pickup location determination system 104 determines a measure of closeness between two or more door points by determining an angular distribution of door points and/or relative proximities of door points to a request location. Based on the angular distribution and the distances to the request location, the pickup location determination system 104 determines distances between door points.

In some embodiments, the pickup location determination system 104 buckets door points into angular door point groups based on angular distribution and distance to a request location. For instance, the pickup location determination system 104 groups together those door points that are within an upper threshold angle and a lower threshold angle and/or within an upper threshold distance and a lower threshold distance in relation to a request location. The pickup location determination system 104 further determines selection scores and identifies those door points whose scores satisfy a selection score threshold. The pickup location determination system 104 filters out those door points whose selection scores fail to satisfy the threshold. Indeed, for any door points that the pickup location determination system 104 determines to be within a threshold distance (e.g., 5 feet, 10 feet, 10 meters, 20 feet, or 20 meters) of one or more other door points, the pickup location determination system 104 selects a door point with a highest selection score among them and filters out the rest.

To elaborate, the pickup location determination system 104 determines that the two door points within the box 604 are within a threshold distance (e.g., 10 meters or 20 meters) of each other, and the pickup location determination system 104 compares the selection scores of both door points. Upon determining that one of the door points has a higher score than the other, the pickup location determination system 104 filters out the door point with the lower score and keeps only the door point with the higher score, as shown in the box 610. As another example, the pickup location determination system 104 identifies three different door points within the box 606 that are within a threshold distance of each other—i.e., the pickup location determination system 104 determines that a first door point is within a threshold distance of a second door point and is also within the threshold distance of a third door point.

The pickup location determination system 104 compares the selection scores of the door points and filters out the door points with the lower scores, keeping only the door point with the highest selection score among the three, as shown by the box 612. Indeed, the pickup location determination system 104 can rank the door points according to selection score to select the door point with the highest selection score (e.g., determined by user-specific request history or system-wide popularity, as described). By filtering out door points that are within a threshold distance of another door point, the pickup location determination system 104 reduces redundant information and thereby improves efficiency and accuracy in generating a pickup location.

Figure 7A:
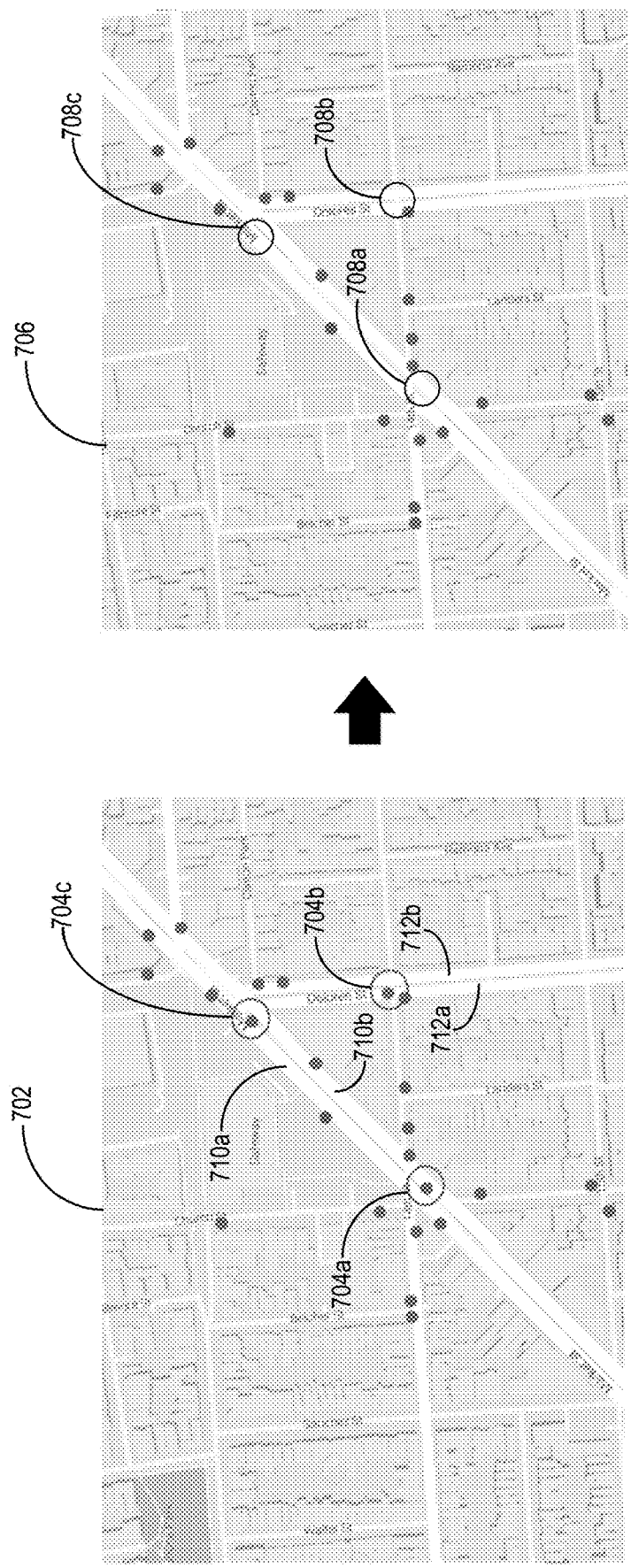
FIG. 7A illustrates an example of filtering out door points located between parallel road segments in accordance with one or more embodiments.

As further mentioned, the pickup location determination system 104 can filter out door points that are located on medians or other areas between two substantially parallel road segments. FIG. 7A illustrates an example unfiltered map 702 that includes door points within the areas 704a-704c, and FIG. 7A further illustrates a corresponding filtered map 706 portraying, within the areas 708a-708c, that the door points within the corresponding areas 704a-704c have been filtered out. In particular, the pickup location determination system 104 filters out the door points within the areas 704a-704c based on determining that the corresponding door points are between parallel road segments 710a and 710b and 712a and 712b.

Indeed, the pickup location determination system 104 identifies parallel (or substantially parallel) road segments such as road segments 710a and 710b as well as road segments 712a and 712b. To determine that two road segments are parallel, the pickup location determination system 104 accesses digital map information such about road segments. In some embodiments, the digital map information includes tags, labels, or other information that indicates relationships between different road segments. For instance, digital map information about the road segment 710a indicates that it is parallel to the road segment 710b. Likewise, digital map information pertaining to the road segment 710b indicates that it is parallel to the road segment 710a.

In these or other embodiments, the pickup location determination system 104 determines that two road segments are parallel by analyzing the road segments. For example, the pickup location determination system 104 analyzes the road segments 712a and 712b to determine that they are substantially parallel by comparing an angle of the road segment 712a with an angle of the road segment 712b. To elaborate, the pickup location determination system 104 determines angles for the road segments 712a and 712b by analyzing the digital map 702 (e.g., a satellite map image) and determining angles of the road segments 712a and 712b relative to Cartesian axes or a polar coordinate system.

In addition to determining angles of the road segments 712a and 712, the pickup location determination system 104 further determines a distance between the road segments 712a and 712b. Thus, upon determining that the road segments 712a and 712b are within a threshold number of degrees or radians from each other and also within a threshold distance of each other, the pickup location determination system 104 determines that the road segments 712 and 712b are parallel. Based on determining that the road segments 710a and 710b and are parallel and that the road segments 712a and 712b are parallel, the pickup location determination system 104 filters out the door points indicated by the areas 704a-704c. Thus, as shown within the filtered digital map 706, the areas 708a-708c do not contain the corresponding door points shown within the unfiltered digital map 702.

Figure 7B:
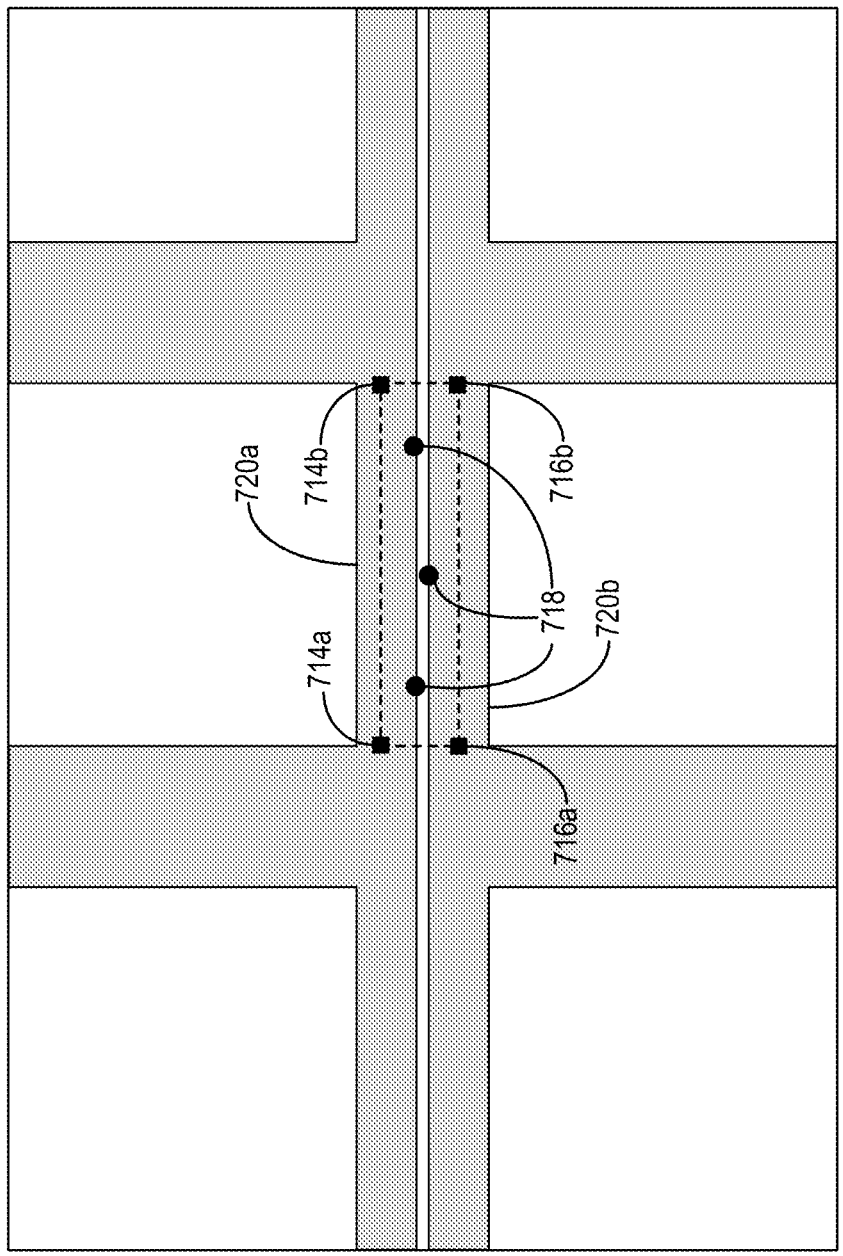
FIG. 7B illustrates an example of generating a polygon for parallel road segments for removing door points based on placement between the parallel road segments in accordance with one or more embodiments.

FIG. 7B illustrates an example depiction of how the pickup location determination system 104 identifies door points within a median (or in another area between two parallel road segments) to remove them. As illustrated in FIG. 7B, the pickup location determination system 104 determines that the road segments 720a and 720b are parallel. Based on determining that the road segments 720a and 720b are parallel, the pickup location determination system 104 utilizes a geometric analysis to identify the door points 718 located within the area between the road segments 720a and 720b.

More specifically, the pickup location determination system 104 determines a start node and an end node for each of the road segments 720a and 720b. For instance, the pickup location determination system 104 determines a start node 714a and an end node 714b for the road segment 720a. Likewise, the pickup location determination system 104 determines a start node 716a and an end node 716b for the road segment 720b. In some embodiments, the pickup location determination system 104 places the nodes 714a, 714b, 716a, and 716b in the center of the road segments 720a and 720b (i.e., centrally located between the sides of the road segments), while in other embodiments the pickup location determination system 104 can utilize an inside edge or an outside edge as a placement for the nodes 714a, 714b, 716a, and 716b.

In some embodiments, the pickup location determination system 104 determines start nodes 714a and 716a and end nodes 714b and 716b based on orientation within a digital map. For instance, the pickup location determination system 104 determines that the leftmost end of a road segment is a start node while a rightmost end of a road segment is an end node. In some embodiments, however, the pickup location determination system 104 utilizes the reverse orientation, where rightmost ends of road segments are start nodes and leftmost ends are end nodes. In these or other embodiments, the pickup location determination system 104 determines that a topmost end is a start node while a bottommost end as an end node. In other embodiments, the pickup location determination system 104 utilizes the reverse orientation where topmost ends of road segments are end nodes and bottommost ends are start nodes.

In some embodiments, such as in cases where road segments correspond to one-way traffic streets, the pickup location determination system 104 determines the start node 714a and the end node 714b based on a direction of traffic along the road segment 720a. For example, the pickup location determination system 104 determines that the start node 714a corresponds to an end of the road segment 720a where transportation vehicles enter the road segment 720a, while the end node 714b corresponds to an end of the road segment 720a where transportation vehicles exit the road segment 720a. In these embodiments, assuming the traffic of the road segment 720b flows in the opposite direction of the traffic of the road segment 720a, the pickup location determination system 104 can determine that the node 716b is a start node for the road segment 720b, while the node 716a is an end node.

Based on determining the nodes 714a, 714b, 716a, and 716b for the two parallel road segments 720a and 720b, the pickup location determination system 104 further generates a polygon such as a rectangle (or a shape that is nearly rectangular) with the nodes 714a, 714b, 716a, and 716b at the corners. Indeed, as illustrated in FIG. 7B, the pickup location determination system 104 generates a rectangle that encloses each of the door points 718. Thus, based on determining that the door points 718 are located within the bounds of the rectangle defined by the nodes 714a, 714b, 716a, and 716b, the pickup location determination system 104 filters out the door points 718.

Figure 7C:
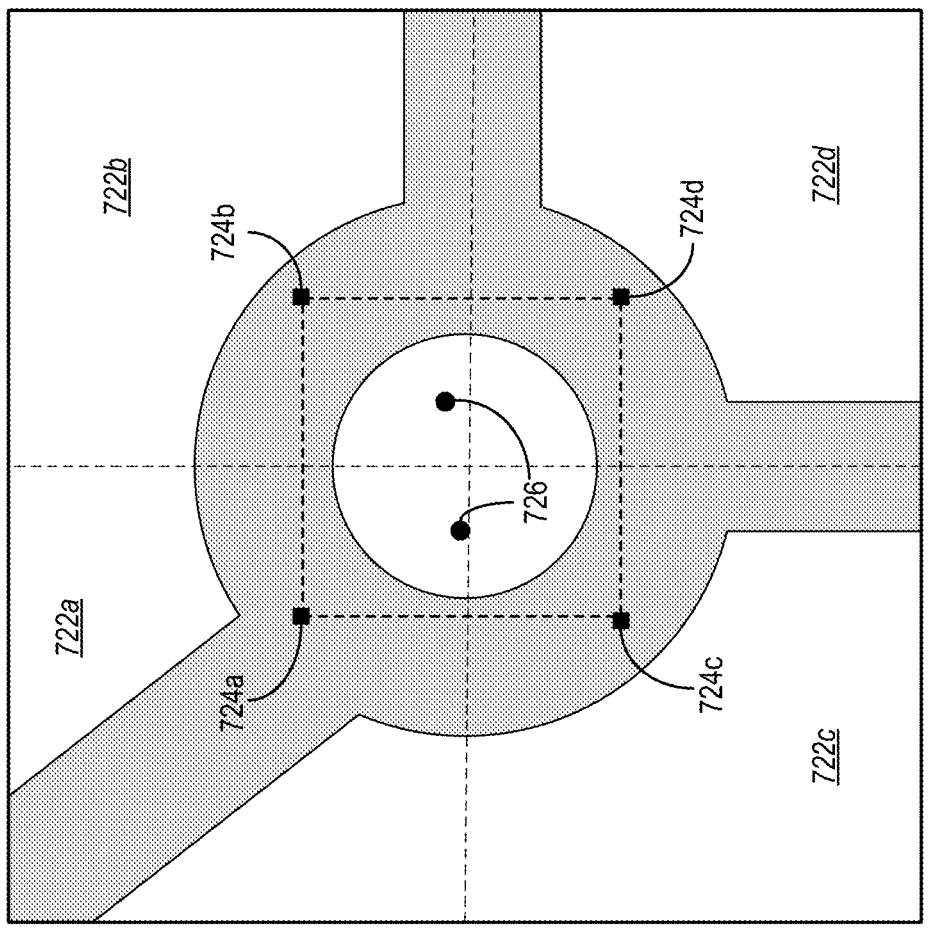
FIG. 7C illustrates an example of generating a polygon for a roundabout for removing door points based on placement within the roundabout in accordance with one or more embodiments.

In addition (or alternatively), the pickup location determination system 104 can filter out door points based on other locations relative to particular road segments. For example, FIG. 7C illustrates an example of how the pickup location determination system 104 filters out door points based on locations relative to roundabouts, traffic circles, or other road segments. To elaborate, the pickup location determination system 104 identifies roundabouts and/or traffic circles based on street metadata that labels the roundabout and/or traffic circle. Thus, the pickup location determination system 104 filters out door points located within a threshold distance of a centroid of a roundabout/traffic circle.

In some embodiments, the pickup location determination system 104 identifies door points 726 to filter out relative to a roundabout or traffic circle by generating a polygon based on nodes 724a-724d around the roundabout/traffic circle. For instance, the pickup location determination system 104 segments a roundabout/traffic circle into four quadrants 722a-722d and places a node centrally on the road in each quadrant. In some embodiments, the pickup location determination system 104 segments the roundabout/traffic circle into more or fewer than four segments and places a node centrally in each segment. Additionally, the pickup location determination system 104 generates a polygon by connecting nodes 724a-724d to adjacent nodes. Thus, the pickup location determination system 104 removes or filters out door points 726 located within the bounds of a generated polygon.

Figure 7D:
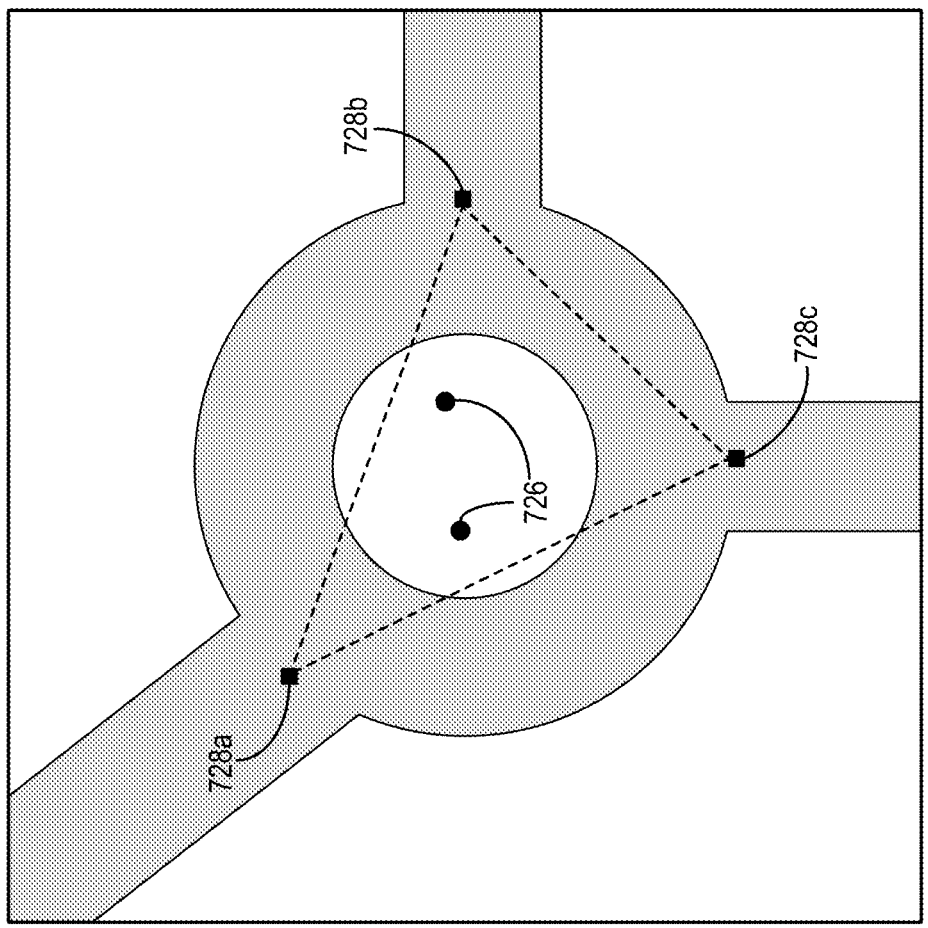
FIG. 7D illustrates another example of generating a polygon for a roundabout for removing door points based on placement within the roundabout in accordance with one or more embodiments.

In other embodiments, the pickup location determination system 104 identifies door points to filter out relative to a roundabout or traffic circle by generating a polygon anchored by end points of road segments. Indeed, FIG. 7D illustrates an example of generating a triangular polygon based on three nodes 728a-728c placed end points of respective roads. As illustrated, the pickup location determination system 104 generates the polygon by placing the nodes 728a-728c at end points of road segments entering the traffic circle.

Indeed, the pickup location determination system 104 identifies road segments that form or enter the traffic circle and places nodes at end points where the road segments enter the traffic circle. While FIG. 7D illustrates three road segments and three nodes 728a-728c at the end points, in some embodiments the pickup location determination system 104 generates nodes at end points of each road segment entering/forming the traffic circle. Thus, the pickup location determination system 104 generates a polygon having as many corners as nodes at end points of the traffic circle. Further, the pickup location determination system 104 filters out the door points 726 based on determining that the door points 726 are within the polygon.

Figure 8:
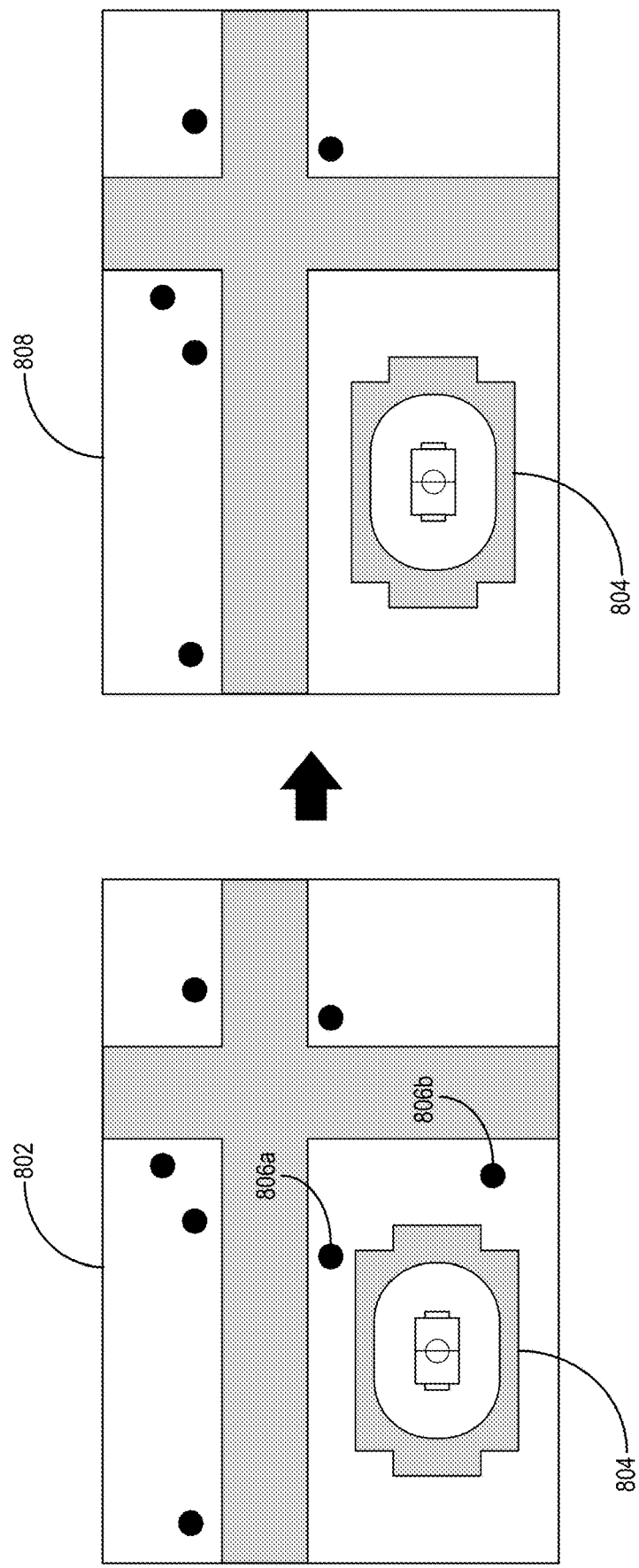
FIG. 8 illustrates an example of filtering out door points based on proximity to a venue in accordance with one or more embodiments.

As mentioned above, the pickup location determination system 104 can filter out door points based on proximity to venues. Indeed, FIG. 8 illustrates an example depiction of removing door points 806a and 806b that are within a threshold venue distance of a venue 804. In particular, the pickup location determination system 104. In some embodiments, the door points 806a and 806b may be associated with the venue 804 itself or may be associated with buildings near the venue 804. To determine that the door points 806a and 806b are within a threshold venue distance (e.g., a distance of a door point from a venue), the pickup location determination system 104 compares the door points 806a and 806b (and others) with a centroid of the venue 804.

The pickup location determination system 104 determines the venue 804 based on event schedules, digital map information, and/or transportation matching system information. For example, the pickup location determination system 104 analyzes an event schedule to determine that an event is taking place at the venue 804 during the same time that the pickup location determination system 104 receives a transportation request to match with a provider. As another example, the pickup location determination system 104 analyzes information for multiple transportation vehicles (e.g., via the provider devices 108a-108n) to determine that a threshold number of requesters have been requested rides from and/or been dropped off at the venue 804 within a threshold duration of time from the received transportation request that the pickup location determination system 104 matches with a provider.

In these or other embodiments, the pickup location determination system 104 identifies particular locations and/or buildings as venues based on a volume of transportation requests originating from the location/building within a given time period. Additionally, the pickup location determination system 104 compares periods of high volumes of requests with event schedules at the originating location to verify that an event is taking place (or recently took place) at the location. Thus, the pickup location determination system 104 identifies the venue 804 as a venue based on a number of transportation requests originating within a threshold distance of the centroid of the venue 804 within a given time period and/or based on an event schedule.

As illustrated in FIG. 8, the unfiltered digital map 802 includes the door points 806a and 806b, while the filtered digital map 808 does not depict the door points 806a and 806b. Indeed, the pickup location determination system 104 determines that the door points 806a and 806b are within a threshold venue distance (e.g., 10 meters, 20 meters, 100 meters, or 200 meters) of a centroid of the venue 804. Thus, the pickup location determination system 104 removes or filters out the door points 806a and 806b to improve the accuracy and efficiency of matching a received transportation request with a provider.

In some embodiments, the pickup location determination system 104 filters out door points by filtering out intersection points. To elaborate, the pickup location determination system 104 identifies intersection points within a threshold venue distance of a venue (e.g., the venue 804) and filters out the intersection point. Additionally, the pickup location determination system 104 filters out those door points that are located within an intersection radius of the filtered-out intersection points. Thus, the pickup location determination system 104 filters out door points based on filtering out intersection points relative to venue location.

Figure 9:
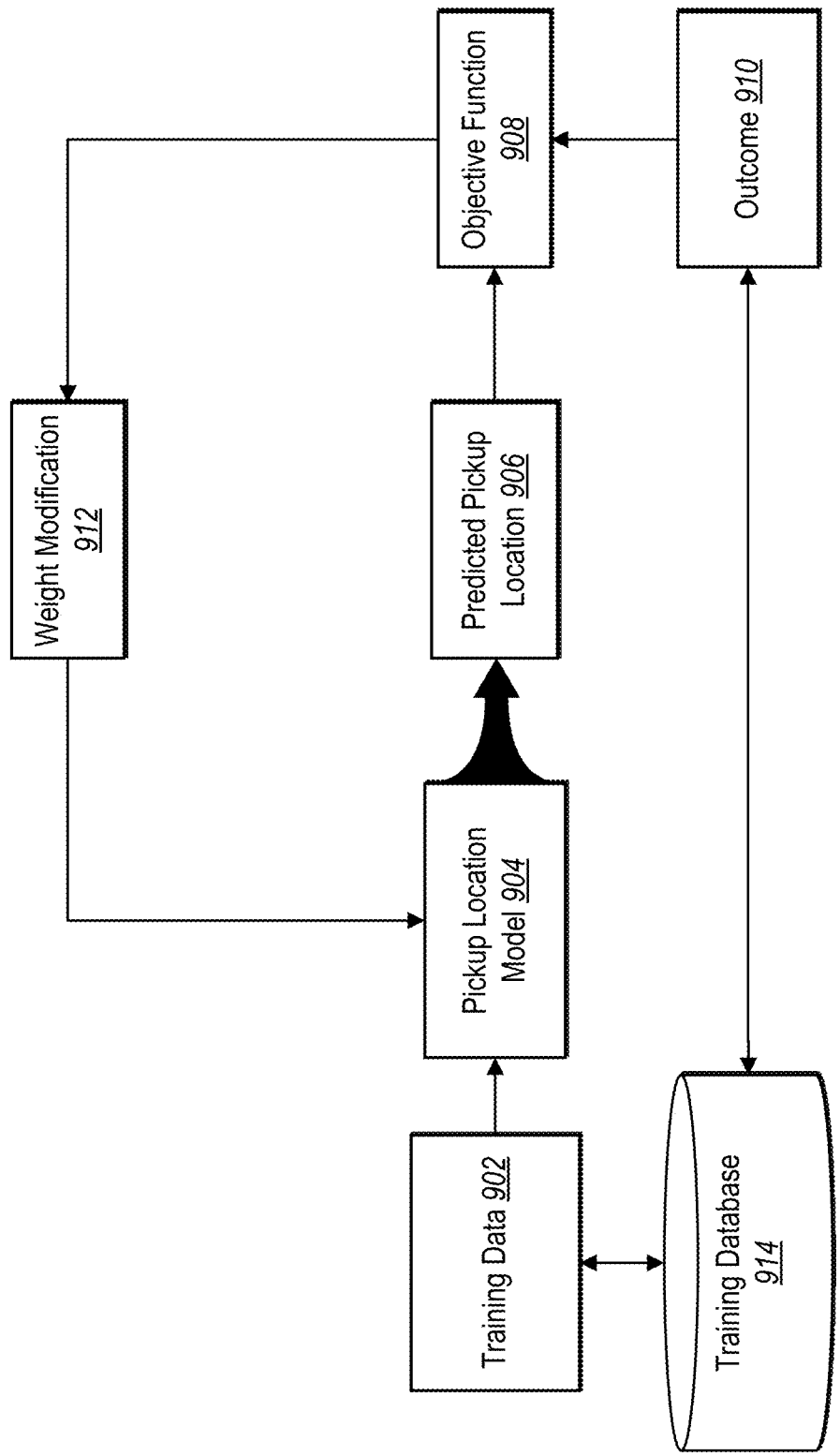
FIG. 9 illustrates an example process of training a pickup location model in accordance with one or more embodiments.

As further mentioned, the pickup location determination system 104 can train and implement a pickup location model to generate, select, or determine a pickup location for a transportation request based on a filtered set of door points. FIG. 9 illustrates an example process by which the pickup location determination system 104 trains a pickup location model 904 (e.g., the pickup location model 206) to generate accurate predictions of pickup locations based on input information. In some embodiments, for example, the pickup location determination system 104 trains the pickup location model 904 based on an explore/exploit technique by making small variations in the training data 902 (e.g., training door points) and optimizing based on respective outcomes. Indeed, in these embodiments, the pickup location model 904 can include a multi-armed bandit algorithm.

As illustrated in FIG. 9, the pickup location determination system 104 accesses training data 902 from a training database 914. For example, the pickup location determination system 104 accesses training data 902 such as training door points to input into the pickup location model 904. Based on the training data 902, the pickup location determination system 104 utilizes the pickup location model 904 to generate a predicted pickup location 906. In particular, the pickup location determination system 104 generates the predicted pickup location 906 based on the training data 902 by implementing the pickup location model 904 to balance between exploitation and exploration of new training data (e.g., new door points).

Based on generating the predicted pickup location 906, the pickup location determination system 104 further accesses a ground truth outcome 910 (e.g., a ground truth pickup location) from the training database 914. The pickup location determination system 104 further utilizes an objective function 908 to compare the outcome 910 with a predicted pickup location 906. To elaborate, the pickup location determination system 104 utilizes the objective function 908 (or a series of objective functions) to determine a measure of discrepancy or consistency between the predicted pickup location 906 and the ground truth outcome 910.

In addition, the pickup location determination system 104 utilizes a weight modification 912 to improve the accuracy of the pickup location model 904 by reducing a measure of discrepancy determined via the objective function 908. For example, the pickup location determination system 104. In particular, the pickup location determination system 104 modifies one or more weights associated with the pickup location model 904. In response to modifying one or more of the weights, the pickup location determination system 104 utilizes the pickup location model 904 to generate a new predicted pickup location based on new training data.

The pickup location determination system 104 thus repeats the process of applying the objective function 908, modifying the weights to reduce loss, and generating new predicted pickup locations based on new training data to improve the accuracy of the pickup location model 904. The pickup location determination system 104 can constantly (or at certain time intervals) train the pickup location model 904. Thus, upon training the pickup location model 904, the pickup location determination system 104 can implement or utilize the trained pickup location model 904 to accurately select pickup locations from filtered sets of door points.

For example, the pickup location determination system 104 determines a pickup location based on system-wide information to balance considerations of provider locations, provider availability, requester locations, request types, transportation routes, and/or saving transportation time and/or cost for requesters. In some embodiments, the pickup location determination system 104 utilizes the pickup location model 904 to select a door point with a highest selection score from the potential pickup locations (e.g., the remaining filtered set of door points). In some embodiments, the pickup location model 904 selects a most popular potential pickup location as the pickup location. In these or other embodiments, the pickup location model 904 selects a closest potential pickup location as the pickup location. In the same or other embodiments, the pickup location model 904 selects a pickup location based on internal weights, neurons, and layers associated with the pickup location model 904 which define how the pickup location model 904 analyzes information.

Figure 10:
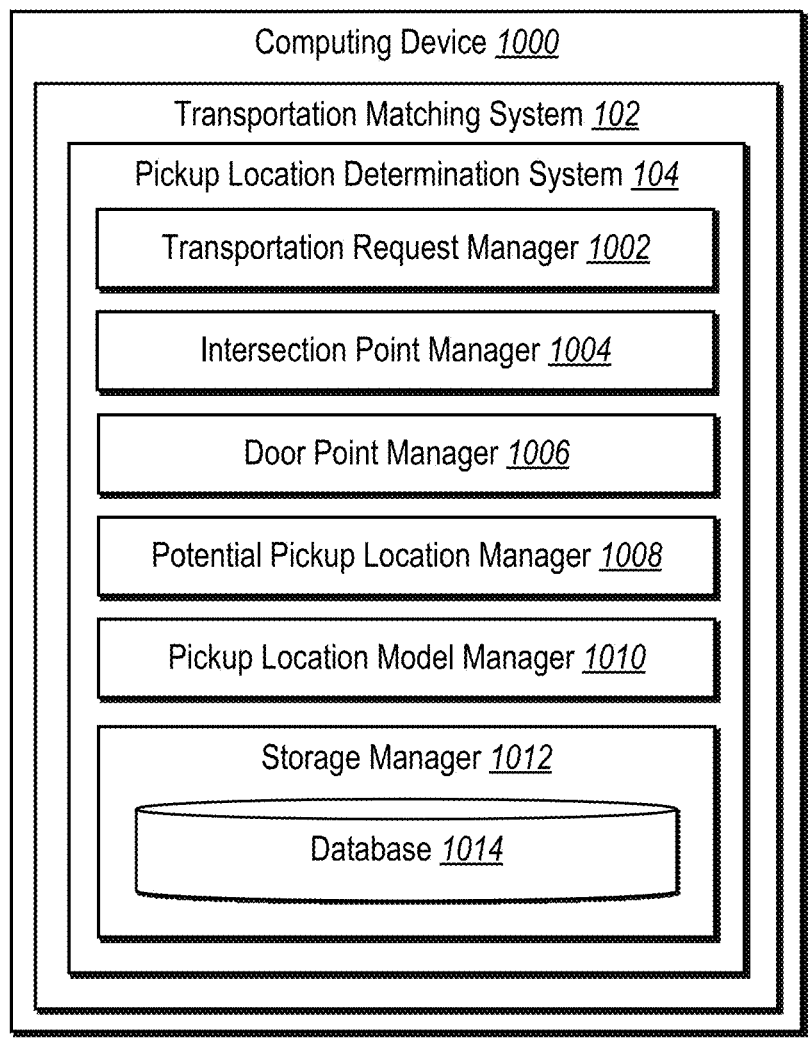
FIG. 10 illustrates a block diagram of an example computing device including various components of a pickup location determination system in accordance with one or more embodiments.

Looking now to FIG. 10, additional detail will be provided regarding components and capabilities of the pickup location determination system 104. Specifically, FIG. 10 illustrates an example schematic diagram of the pickup location determination system 104 on an example computing device 1000 (e.g., one or more of the provider devices 108a-108n, the requester devices 112a-112n, and/or the server(s) 106). As shown in FIG. 10, the pickup location determination system 104 may include a transportation request manager 1002, an interaction point manager 1004, a door point manager 1006, a potential pickup location manager 1008, a pickup location model manager 1010, and a storage manager 1012.

As just mentioned, the pickup location determination system 104 includes a transportation request manager 1002. In particular, the transportation request manager 1002 manages, receives, detects, monitors, or identifies transportation requests from one or more requester devices (e.g., the requester devices 112a-112n). For example, the transportation request manager 1002 receives transportation requests from requester devices and determines request information such as a request location, a request type, transportation preferences (e.g., vehicle type and/or music preferences), and a destination location. In addition, the transportation request manager 1002 can determine a request radius associated with a received transportation request. The transportation request manager 1002 can communicate with other components such as the intersection point manager 1004 to determine intersection points and the door point manager 1006 to determine door points for a transportation request. The transportation request manager 1002 can further communicate with the storage manager 1012 to store and/or access information within the database 1014 such as request locations associated with particular requester devices.

As shown, the pickup location determination system 104 also includes an intersection point manager 1004. In particular, the intersection point manager 1004 can manage, determine, identify, generate, or detect intersection points within a request radius. As described, the intersection point manager 1004 determines intersection points relative to intersections of road segments within a request radius associated with a received transportation request. In addition, the intersection point manager 1004 can determine an intersection radius associated with a given intersection point. The intersection point manager 1004 can likewise determine intersection radii for each intersection point within a request radius of a received transportation request. In addition, the intersection point manager 1004 can communicate with the door point manager 1006 to determine door points within a given intersection radius.

As illustrated in FIG. 10, the pickup location determination system 104 includes a door point manager 1006. In particular, the door point manager 1006 manages, determines, identifies, generates, or detects door points associated with a received transportation request. For example, the door point manager 1006 determines door points within an intersection radius of an intersection point and further determines other door points within a different intersection radius of a different intersection point.

Further, the pickup location determination system 104 includes a potential pickup location manager 1008. In particular, the potential pickup location manager 1008 manages, determines, identifies, generates, or detects potential pickup locations for a transportation request based on door points. For example, the potential pickup location manager 1008 utilizes one or more location filtering techniques to filter out door points based on the various factors described herein. Thus, the potential pickup location manager 1008 generates potential pickup locations as a filtered set of door points from which the pickup location determination system 104 selects a pickup location. Additionally, the potential pickup location manager 1008 communicates with the storage manager 1012 to store potential pickup locations within the database 1014 for access by other components of the pickup location determination system 104.

As illustrated, the pickup location determination system 104 includes a pickup location model manager 1010. In particular, the pickup location model manager 1010 manages, maintains, trains, utilizes, implements, or applies a pickup location model (e.g., the pickup location model 206 and/or 904) to generate, determine, select, or identify pickup locations from potential pickup locations. Indeed, the pickup location model manager 1010 communicates with the potential pickup location manager 1008 to determine a pickup location from the determined potential pickup locations. In addition, the pickup location model manager 1010 communicates with the storage manager 1012 to access training data from the database 1014 (e.g., the training database 914) to train a pickup location model as described above.

In one or more embodiments, each of the components of the pickup location determination system 104 are in communication with one another using any suitable communication technologies. Additionally, the components of the pickup location determination system 104 can be in communication with one or more other devices including one or more client devices described above. It will be recognized that although the components of the pickup location determination system 104 are shown to be separate in FIG. 10, any of the subcomponents may be combined into fewer components, such as into a single component, or divided into more components as may serve a particular implementation. Furthermore, although the components of FIG. 10 are described in connection with the pickup location determination system 104, at least some of the components for performing operations in conjunction with the pickup location determination system 104 described herein may be implemented on other devices within the environment.

The components of the pickup location determination system 104 can include software, hardware, or both. For example, the components of the pickup location determination system 104 can include one or more instructions stored on a computer-readable storage medium and executable by processors of one or more computing devices (e.g., the computing device 1000). When executed by the one or more processors, the computer-executable instructions of the pickup location determination system 104 can cause the computing device 1000 to perform the methods described herein. Alternatively, the components of the pickup location determination system 104 can comprise hardware, such as a special purpose processing device to perform a certain function or group of functions. Additionally or alternatively, the components of the pickup location determination system 104 can include a combination of computer-executable instructions and hardware.

Furthermore, the components of the pickup location determination system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the pickup location determination system 104 may be implemented as part of a stand-alone application on a personal computing device or a mobile device. Alternatively or additionally, the components of the pickup location determination system 104 may be implemented in any application that allows creation and delivery of marketing content to users, including, but not limited to, various applications.

FIGS. 1-10, the corresponding text, and the examples provide a number of different systems, methods, and non-transitory computer readable media for determining a pickup location based on filtering out door points and utilizing a pickup location model. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
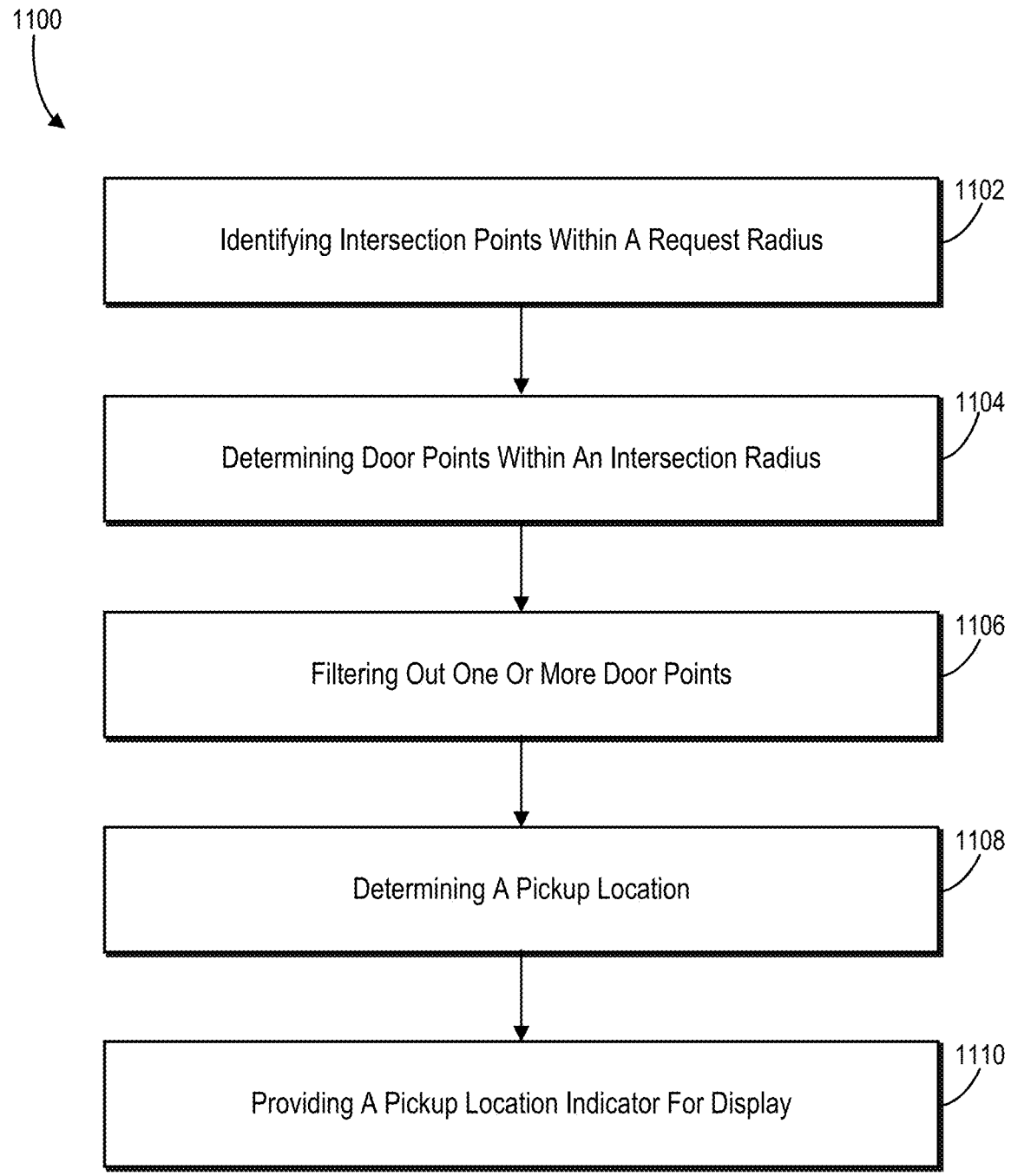
FIG. 11 illustrates an example flow of acts for determining a pickup location based on filtering door points and utilizing a pickup location model in accordance with one or more embodiments.

While FIG. 11 illustrates acts according to some embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for determining a pickup location based on filtering out door points and utilizing a pickup location model. The series of acts 1100 can include an act 1102 of identifying intersection points within a request radius. In particular, the act 1102 can involve identifying, for a transportation request comprising a request location, one or more intersection points within a request radius of the request location. A request radius can include a distance corresponding to a walk time from the request location.

In addition, the series of acts 1100 can include an act 1104 of determining door points within an intersection radius. In particular, the act 1104 can involve determining, for an intersection point of the one or more intersection points within the request radius, a set of door points within an intersection radius of the intersection point. A door point can include a point that indicates a location of a door of a building within a digital map.

As illustrated in FIG. 11, the series of acts 1100 can also include an act 1106 of filtering out door points. In particular, the act 1106 can involve filtering out one or more door points of the set door points by filtering out those door points of the plurality of door points that are within a threshold distance of another door point to determine one or more potential pickup locations. The act 1106 can further involve generating a polygon defined by start nodes and end nodes of two parallel road segments and filtering out door points of the plurality of door points that are within the polygon. In some embodiments, the act 1106 can involve identifying a venue within the request radius of the request location and filtering out one or more door points of the plurality of door points based on relative proximity to the venue. In these or other embodiments, the act 1106 can involve accessing a map database that includes street metadata and based on the street metadata within the map database, filtering out one or more door points of the plurality of door points that are on a street whose metadata indicates the street is undesirable for pickup.

Further, the series of acts 1100 can include an act 1108 of utilizing a pickup location model to determine a pickup location. In particular, the act 1108 can involve utilizing a pickup location model to determine, from the one or more potential pickup locations, a pickup location for the transportation request based on locations of available transportation providers.

The series of acts 1100 can further include an act 1110 of providing a pickup location indicator for display within a pickup location interface. In particular, the act 1110 can involve providing, for display on a requester device, a pickup location interface including an indication of the pickup location.

The series of acts 1100 can also include an act of determining selection scores for the plurality of door points, wherein a selection score indicates a probability of selecting a corresponding door point as a potential pickup location. In addition, filtering out those door points of the plurality of door points that are within the threshold distance of another door point can include selecting a door point with a highest selection score from among a group of door points within the threshold distance.

In addition, the series of acts 1100 can include an act of generating one or more potential pickup locations. In particular, the act can involve generating one or more potential pickup locations based on a subset of door points that remain after the filtering of the set of door points.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
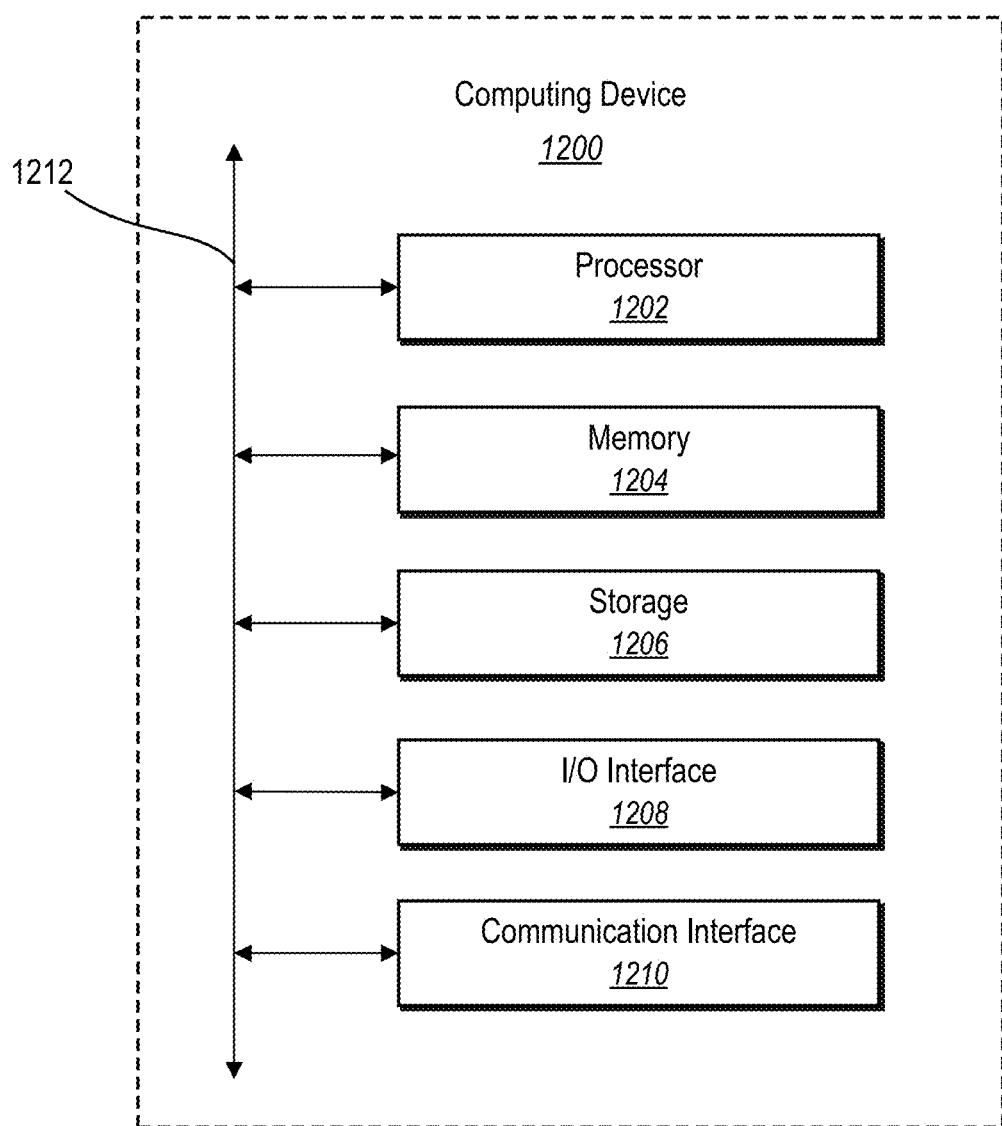
FIG. 12 illustrates a block diagram of a computing device for implementing one or more embodiments of the present disclosure.

FIG. 12 illustrates, in block diagram form, an exemplary computing device 1200 (e.g., the computing device 1000) that may be configured to perform one or more of the processes described above. One will appreciate that the pickup location determination system 104 can comprise implementations of the computing device 1200, including, but not limited to, the provider devices 108a-108n, the requester devices 112a-112n, and/or the server(s) 106. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive ("HDD"), flash memory, a Universal Serial Bus ("USB") drive or a combination of these or other storage devices.

The computing device 1200 also includes one or more input or output interface 1208 (or "I/O interface 1208"), which are provided to allow a user (e.g., requester or provider) to provide input to (such as user strokes), receive output from, and otherwise transfer data to and from the computing device 1200. These I/O interface 1208 may include a mouse, keypad or a keyboard, a touch screen, camera, optical scanner, network interface, modem, other known I/O devices or a combination of such I/O interface 1208. The touch screen may be activated with a stylus or a finger.

The I/O interface 1208 may include one or more devices for presenting output to a user, including, but not limited to, a graphics engine, a display (e.g., a display screen), one or more output providers (e.g., display providers), one or more audio speakers, and one or more audio providers. In certain embodiments, interface 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can comprise hardware, software, or both that connects components of computing device 1200 to each other.

Figure 13:
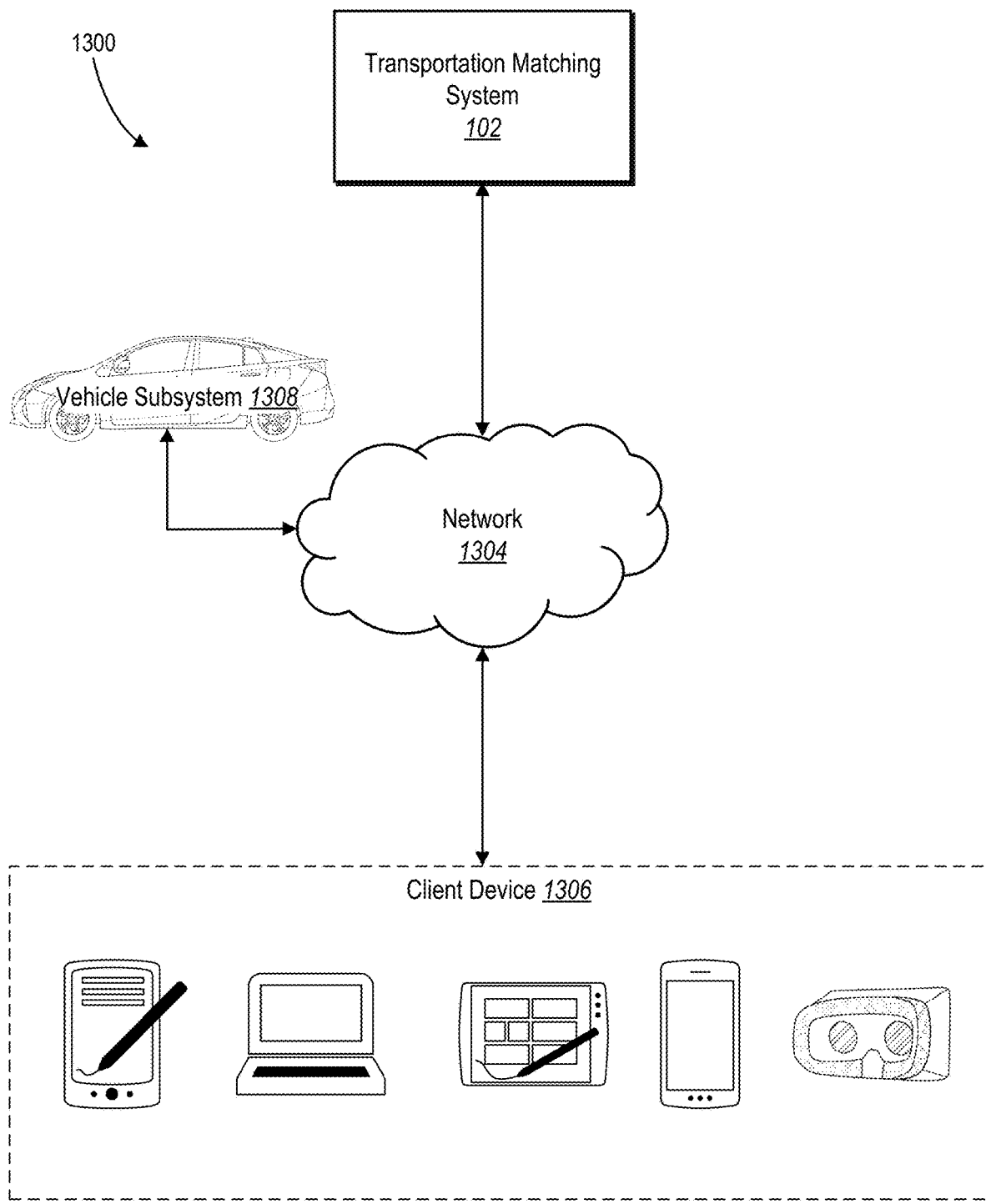
FIG. 13 illustrates an example environment for a dynamic pickup location determination system in accordance with one or more embodiments.

FIG. 13 illustrates an example network environment 1300 of the transportation matching system 102. The network environment 1300 includes a client device 1306 (e.g., one or more of the provider devices 108a-108n and/or requester devices 112a-112n), a transportation matching system 102, and a vehicle subsystem 1308 connected to each other by a network 1304. Although FIG. 13 illustrates a particular arrangement of the client device 1306, the transportation matching system 102, the vehicle subsystem 1308, and the network 1304, this disclosure contemplates any suitable arrangement of client device 1306, the transportation matching system 102, the vehicle subsystem 1308, and the network 1304. As an example, and not by way of limitation, two or more of client device 1306, the transportation matching system 102, and the vehicle subsystem 1308 communicate directly, bypassing network 1304. As another example, two or more of client device 1306, the transportation matching system 102, and the vehicle subsystem 1308 may be physically or logically co-located with each other in whole or in part.

Moreover, although FIG. 13 illustrates a particular number of client devices 1306, transportation matching systems 102, vehicle subsystems 1308, and networks 1304, this disclosure contemplates any suitable number of client devices 1306, transportation matching system 102, vehicle subsystems 1308, and networks 1304. As an example, and not by way of limitation, network environment 1300 may include multiple client device 1306, transportation matching system 102, vehicle subsystems 1308, and/or networks 1304.

This disclosure contemplates any suitable network 1304. As an example, and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, pickup location determination system 104, and vehicle subsystem 1308 to network 1304 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above in relation to FIG. 12. A client device 1306 may enable a network user at the client device 1306 to access network 1304. A client device 1306 may enable its user to communicate with other users at other client devices 1306.

In particular embodiments, the client device 1306 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1306 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1300 either directly or via network 1304. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1306, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1304.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1306. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1306 associated with users.

In addition, the vehicle subsystem 1308 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1308 can include an autonomous vehicle—i.e., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once—i.e., split up throughout the vehicle subsystem 1308 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMG ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1308 may include a communication device capable of communicating with the client device 1306 and/or the pickup location determination system 104. For example, the vehicle subsystem 1308 can include an on-board computing device communicatively linked to the network 1304 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, by one or more servers, a transportation request from a requester device indicating a request location;
   generating, by the one or more servers, door points for the transportation request associated with the request location by:
   determining a request radius for the request location of the transportation request;
   identifying a plurality of intersection points within the request radius of the request location;
   determining a plurality of intersection radii for the plurality of intersection points identified within the request radius; and
   generating a set of door points within an intersection radius from the plurality of intersection radii;
   determining, by the one or more servers, distances between door points of the set of door points within the intersection radius;
   generating a filtered set of potential pickup locations based on determining the distances between the door points by removing, from the set of door points, one or more door points that are within a threshold distance of another door point;
   determining, utilizing a pickup location model to process the filtered set of potential pickup locations, a pickup location for the transportation request based on locations of available transportation providers; and providing, by the one or more servers for display on the requester device, a pickup location interface including an indication of the pickup location.

2. The computer-implemented method of claim 1, wherein generating the filtered set of potential pickup locations comprises:
   generating a polygon defined by one or more nodes of road segments; and
   filtering out door points from the set of door points that are within the polygon.

3. The computer-implemented method of claim 1, wherein generating the filtered set of potential pickup locations comprises:
   identifying a venue within the request radius of the request location; and
   filtering out the one or more door points from the set of door points based on a threshold venue distance.

4. The computer-implemented method of claim 3, wherein generating the filtered set of potential pickup locations comprises:
   determining, based on an event schedule associated with the venue, that an event is taking place at the venue; and
   filtering out the one or more door points from the set of door points based on determining that the event is taking place.

5. The computer-implemented method of claim 1, wherein generating the filtered set of potential pickup locations comprises determining selection scores for the set of door points based at least in part on previous pickup locations, wherein a selection score indicates a probability of selecting a corresponding door point as a potential pickup location.

6. The computer-implemented method of claim 1, wherein generating the filtered set of potential pickup locations comprises:
   accessing a map database that includes street metadata;
   determining acceptability scores for the set of door points based on the street metadata;
   identifying at least one door point of the set of door points with an acceptability score that fails to satisfy a threshold acceptability score; and
   filtering out the at least one door point based on the acceptability score failing to satisfy the threshold acceptability score.

7. The computer-implemented method of claim 1, wherein generating the filtered set of potential pickup locations comprises:
   identifying, from the plurality of intersection points within the request radius, a given intersection point that is within a threshold distance of an incompatible road; and
   filtering out door points within an intersection radius of the given intersection point.

8. A non-transitory computer readable medium comprising instructions that, when executed by at least one processor, cause a computer device to:
   receive a transportation request from a requester device indicating a request location;
   generate door points for the transportation request associated with the request location by:
      determining a request radius for the request location of the transportation request;
      identifying a plurality of intersection points within the request radius of the request location;
      determining a plurality of intersection radii for the plurality of intersection points identified within the request radius; and
      generating a set of door points within an intersection radius from the plurality of intersection radii;
   determine distances between door points of the set of door points within the intersection radius;
   generate a filtered set of potential pickup locations based on determining the distances between the door points by removing, from the set of door points, one or more door points from the set of door points that are within a threshold distance of another door point;
   determine, utilizing a pickup location model to process the filtered set of potential pickup locations, a pickup location for the transportation request based on locations of available transportation providers; and
   provide, for display on a requester device, a pickup location interface including an indication of the pickup location.

9. The non-transitory computer readable medium of claim 8, further comprising instructions that, when executed by the at least one processor, cause the computer device to generate the filtered set of potential pickup locations by:
   generating a polygon defined by one or more nodes of road segments; and
   filtering out door points from the set of door points that are within the polygon.

10. The non-transitory computer readable medium of claim 8, further comprising instructions that, when executed by the at least one processor, cause the computer device to generate the filtered set of potential pickup locations by:
    identifying a venue within the request radius of the request location; and
    filtering out the one or more door points from the set of door points based on a threshold venue distance.

11. The non-transitory computer readable medium of claim 10, further comprising instructions that, when executed by the at least one processor, cause the computer device to generate the filtered set of potential pickup locations by:
    determining, based on an event schedule associated with the venue, that an event is taking place at the venue; and
    filtering out the one or more door points from the set of door points based on determining that the event is taking place.

12. The non-transitory computer readable medium of claim 8, further comprising instructions that, when executed by the at least one processor, cause the computer device to generate the filtered set of potential pickup locations by determining selection scores for the set of door points based at least in part on previous pickup locations, wherein a selection score indicates a probability of selecting a corresponding door point as a potential pickup location.

13. The non-transitory computer readable medium of claim 8, further comprising instructions that, when executed by the at least one processor, cause the computer device to generate the filtered set of potential pickup locations by:
    accessing a map database that includes street metadata;
    determining acceptability scores for the set of door points based on the street metadata;
    identifying at least one door point of the set of door points with an acceptability score that fails to satisfy a threshold acceptability score; and
    filtering out the at least one door point based on the acceptability score failing to satisfy the threshold acceptability score.

14. The non-transitory computer readable medium of claim 8, further comprising instructions that, when executed by the at least one processor, cause the computer device to generate the filtered set of potential pickup locations by:
identifying, from the plurality of intersection points within the request radius, a given intersection point that is within a threshold distance of an incompatible road; and
filtering out door points within an intersection radius of the given intersection point.

15. A system comprising:
at least one processor; and
a non-transitory computer readable medium comprising instructions that, when executed by at least one processor, cause the system to:
receive a transportation request from a requester device indicating a request location;
generate door points for the transportation request associated with the request location by:
 determining a request radius for the request location of the transportation request;
 identifying a plurality of intersection points within the request radius of the request location;
 determining a plurality of intersection radii for the plurality of intersection points identified within the request radius; and
 generating a set of door points within an intersection radius from the plurality of intersection radii;
determine distances between door points of the set of door points within the intersection radius;
generate a filtered set of potential pickup locations based on determining the distances between the door points by removing, from the set of door points, one or more door points from the set of door points that are within a threshold distance of another door point;
determine, utilizing a pickup location model to process the filtered set of potential pickup locations, a pickup location for the transportation request based on locations of available transportation providers; and
provide, for display on a requester device, a pickup location interface including an indication of the pickup location.

16. The system of claim 15, further comprising instructions that, when executed by the at least one processor, cause the system to generate the filtered set of potential pickup locations by:
generating a polygon defined by one or more nodes of road segments; and
filtering out door points from the set of door points that are within the polygon.

17. The system of claim 15, further comprising instructions that, when executed by the at least one processor, cause the system to generate the filtered set of potential pickup locations by:
identifying a venue within the request radius of the request location; and
filtering out the one or more door points from the set of door points based on a threshold venue distance.

18. The system of claim 17, further comprising instructions that, when executed by the at least one processor, cause the system to generate the filtered set of potential pickup locations by:
determining, based on an event schedule associated with the venue, that an event is taking place at the venue; and
filtering out the one or more door points from the set of door points based on determining that the event is taking place.

19. The system of claim 15, further comprising instructions that, when executed by the at least one processor, cause the system to generate the filtered set of potential pickup locations by determining selection scores for the set of door points based at least in part on previous pickup locations, wherein a selection score indicates a probability of selecting a corresponding door point as a potential pickup location.

20. The system of claim 15, further comprising instructions that, when executed by the at least one processor, cause the system to generate the filtered set of potential pickup locations by:
accessing a map database that includes street metadata;
determining acceptability scores for the set of door points based on the street metadata;
identifying at least one door point of the set of door points with an acceptability score that fails to satisfy a threshold acceptability score; and
filtering out the at least one door point based on the acceptability score failing to satisfy the threshold acceptability score.

* * * * *